United States Patent [19]

Yoshida et al.

[11] Patent Number: 5,796,720
[45] Date of Patent: Aug. 18, 1998

[54] CONTROL METHOD OF ASYNCHRONOUS DATA COMMUNICATIONS

[75] Inventors: Toshiyuki Yoshida; Takaharu Kajiwara; Yushi Murata; Naoki Sase; Masashi Hirome, all of Fukuoka, Japan

[73] Assignee: Fujitsu Limited, Kanagawa, Japan

[21] Appl. No.: 597,645

[22] Filed: Feb. 6, 1996

[30] Foreign Application Priority Data

Jul. 5, 1995 [JP] Japan .................. 7-169943

[51] Int. Cl.⁶ .................................. H04J 3/14
[52] U.S. Cl. .................................. 370/245
[58] Field of Search .................. 370/241, 242, 370/245, 248, 249; 340/825.05

[56] References Cited

U.S. PATENT DOCUMENTS

| | | | |
|---|---|---|---|
| 4,991,172 | 2/1991 | Cidon et al. | 370/245 |
| 5,142,526 | 8/1992 | Moriue et al. | 370/245 |
| 5,274,638 | 12/1993 | Michihira et al. | 370/245 |
| 5,339,314 | 8/1994 | Tanaka et al. | 370/245 |

FOREIGN PATENT DOCUMENTS

| | | |
|---|---|---|
| 61-49539 | 3/1986 | Japan . |
| 3-250943 | 11/1991 | Japan . |
| 484532 | 3/1992 | Japan . |
| 494237 | 3/1992 | Japan . |

Primary Examiner—Ajit Patel
Attorney, Agent, or Firm—Helfgott & Karas, P.C.

[57] ABSTRACT

There is provided a communication control method for a network including duplexed ring transmission lines and a plurality of communication controlling devices each accommodating a plurality of terminals and adapted to transmit data sent from any of the terminals and receive data over the ring transmission lines, the communication control method comprising the steps of: causing one communication controlling device to transmit monitoring cells simultaneously over the duplexed transmission lines, the monitoring cells each including a pass indication area for retaining a source address and identification information for identifying a passed communication controlling device; and causing another communication controlling device which receives the monitoring cells respectively from the duplexed transmission lines to relay and circulate the monitoring cells respectively over the duplexed transmission lines after writing in the pass indication area of each of the received monitoring cells data indicative of passage of said each monitoring cell. The communication control method improves the efficiency of the fault monitoring and fault reporting on the transmission lines of the ring LAN.

6 Claims, 25 Drawing Sheets

Fig. 5

| VPI / VCI | Source Node Address |
|---|---|
| 0000000h | 00h ~ 3fh |
| . | . |
| . | . |
| . | . |
| . | . |
| . | . |
| . | . |
| ffffffh | 00h ~ 3fh |

Fig. 6

| Source Node Address | Line to be Selected |
|---|---|
| 00h | 0 |
| . | . |
| . | . |
| . | . |
| . | . |
| . | . |
| . | . |
| 3fh | 1 |

0: Select =0-System
1: Select =1-System

Fig. 11

| Address | Counter | Reception State |
|---------|---------|-----------------|
| ooh | 0 ~N | 0 or 1 |
| ⋮ | ⋮ | ⋮ |
| ffh | 0 ~N | 0 or 1 |

Fig. 12

| Currently Selected System | ≠0-System | ≠1-System | System to be Selected Next |
|---|---|---|---|
| =0-System | Abnormal | Abnormal | ≠0-System |
| =0-System | Abnormal | Normal | =1-System |
| =0-System | Normal | Abnormal | =0-System |
| =0-System | Normal | Normal | =0-System |
| =1-System | Abnormal | Abnormal | =1-System |
| =1-System | Abnormal | Normal | =1-System |
| =1-System | Normal | Abnormal | =0-System |
| =1-System | Normal | Normal | =1-System |

Fig. 21

| Present Status | Conditions | Next Status | Action |
|---|---|---|---|
| Select Relay Buffer | Empty | Select Transmission Buffer | m = 0 |
| | m ≠ M | Select Relay Buffer | m + 1 → m |
| | m = M | Select Transmission Buffer | m = 0 |
| Select Transmission Buffer | Empty | Transmit Empty Cell | n = 0 |
| | n ≠ N | Select Transmission Buffer | n + 1 → n |
| | n = N | Select Relay Buffer | n = 0<br>M, N Load |
| Transmit Empty Cell | Transmission Buffer=Empty AND Relay Buffer=Empty | Transmit Empty Cell | |
| | Transmission Buffer≠Empty OR Relay Buffer≠Empty | Select Relay Buffer | |

Fig. 22

| Address | M | N |
|---|---|---|
| 0 ~ 9 | 1 | 9 |
| 10 ~ 19 | 2 | 8 |
| 20 ~ 29 | 3 | 7 |
| 30 ~ 39 | 5 | 5 |
| 40 ~ 49 | 8 | 2 |
| 50 ~ 60 | 10 | 0 |

Prior Art    Fig. 25

| Identifier | Cell Type | Fault Type | Fault Detection Point | Empty | Error Detecting Code |
|---|---|---|---|---|---|

Prior Art    Fig. 26

| Identifier | Cell Type | S N | TUC | BIP-16 | Empty | Error Detecting Code |
|---|---|---|---|---|---|---|

Prior Art    Fig. 27

| Identifier | Cell Type | END-F | ERR-F | SN | PTR | Information ≠1 | Information ≠2 | Error Detecting Code |
|---|---|---|---|---|---|---|---|---|

Fig. 29

| | 0 | 1 | 2 | 3 | 4 | 5 | 6 | 7 | (NODE ADDRESS) |
|---|---|---|---|---|---|---|---|---|---|
| MONITERING CELL MC1 | 1 | 1 | 1 | 1 | 1 | 1 | 1 | 1 | → '8' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC2 | 1 | 1 | 0 | 1 | 1 | 1 | 1 | 1 | → '7' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC3 | 1 | 1 | 0 | 0 | 1 | 1 | 1 | 1 | → '6' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC4 | 1 | 1 | 0 | 0 | 1 | 1 | 1 | 0 | → '5' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC5 | 1 | 1 | 0 | 0 | 1 | 0 | 1 | 0 | → '4' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC6 | 0 | 1 | 0 | 0 | 1 | 0 | 1 | 0 | → '3' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC7 | 0 | 1 | 0 | 0 | 1 | 0 | 0 | 0 | → '2' NUMBER OF PASSED NODES |

| | 0 | 1 | 2 | 3 | 4 | 5 | 6 | 7 | (NODE ADDRESS) |
|---|---|---|---|---|---|---|---|---|---|
| MONITERING CELL MC8 | 0 | 0 | 0 | 0 | 1 | 0 | 0 | 0 | → '1' NUMBER OF PASSED NODES |

CONTROL METHOD OF ASYNCHRONOUS DATA COMMUNICATIONS

BACKGROUND OF THE INVENTION

1. Field of the Invention

The present invention relates to a control method of asynchronous data communicates and, more particularly, to a control method of asynchronous data communications for transmission line monitoring, fault reporting and the like in a local area network in which asynchronous communication terminals are connected over duplexed ring transmission lines.

2. Description of Related Art

FIG. 24 illustrates a fundamental construction of a conventional LAN having duplexed ring transmission lines (hereinafter referred to as "ring LAN").

So-called nodes IN0 to IN3 are communication controlling devices for accommodating a synchronous terminal or an asynchronous terminal in the ring LAN. Data in the form of a so-called cell is transmitted over the ring transmission lines to a desired terminal via a node.

The ring LAN uses one of the duplexed ring transmission lines as a current transmission line. For example, a #0-system is used as the current transmission line and a #1-system is used as a spare transmission line as shown in FIG. 24. Each node stores information of a currently used transmission line.

A cell transmitted from a node IN0 to a node IN3 over the #0-system transmission line, for example, passes through a node IN2. A fault occurring in the #0-system transmission line is detected by a node which detects the missing of a transmission line signal (light block or the like). The node detecting the fault thereafter transmits to the other nodes a cell (fault information cell) containing fault information written in a predetermined position thereof. Upon receiving the cell, the other nodes analyze the cell to switch the transmission line.

In the analysis of the cell, the transmission line to be switched is decided by referring to configuration information of the ring LAN preliminarily stored in each node. Transmission line identifier information included in the cell is rewritten on the basis of the decision on the transmission line, and then the cell is transmitted.

Where a fault occurs which prevents the cell including the fault information written therein from being transmitted through a normal transmission route, each node checks a transmission performance monitoring cell (different from a cell to be used for general data transmission) which is periodically passed around the transmission lines, and determines a cell loss rate and cell error rate for the switching of the transmission line.

FIG. 25 shows an exemplary data format of the fault information cell conventionally used to report a fault. FIG. 26 shows an exemplary data format of the transmission performance monitoring cell conventionally used for the determination of the cell loss and the like, and FIG. 27 shows an exemplary data format of a configuration information cell. The configuration information cell is transmitted to allow each node to know the system configuration of the ring LAN.

Upon receiving a cell transmitted over the current transmission line (#0-system) in the conventional ring LAN shown in FIG. 24, the node judges whether the cell is an empty cell containing no data. If the cell is an empty cell, the node replaces the empty cell with a transmission cell containing desired data to transmit the data over the current transmission line.

In the prior art, a fault information cell containing fault information inserted in a predetermined position thereof is passed around the ring LAN to identify a faulty transmission line, and each node identifies the faulty transmission line by using the fault information received thereby and the configuration information of the LAN preliminarily stored therein.

Further, whenever the system configuration of the LAN (arrangement of nodes and the like) is changed or an additional resource is incorporated in the LAN, the configuration information of the LAN is rewritten in each node and the configuration information cell containing the configuration information is transmitted over the LAN.

Still further, a node that has become unable to receive the fault information cell has to establish another transmission path by selecting a spare transmission line for use at the occurrence of a fault or by transmitting a predetermined cell.

Where a fault occurs which prevents the fault information cell from being transmitted over the ring LAN as described above, only one method for detecting the occurrence of the fault is to determine the cell loss rate or cell error rate by using a transmission performance monitoring cell periodically passed around the LAN.

In such a case, the determination of the cell loss rate or cell error rate requires a certain period of time, so that it takes a considerable time to determine that the fault has been detected. Where the switching of a transmission line is required in a plurality of communication paths after the determination of the fault, the transmission lines for the respective communication paths are switched one after another, whereby a considerable time is required for the completion of the switching for all the communication paths.

Further, the transmission performance monitoring cell and the configuration information cell are passed around the transmission line as different entities in a normal state, and the fault information cell is passed around the transmission line upon the occurrence of the fault, as described above. Therefore, three kinds of cells are passed around the transmission line as ring LAN monitoring cells. This reduces the use efficiency of the transmission lines.

Still further, in the conventional ring LAN, each node is adapted to transmit desired data by picking up an empty cell passed around the transmission lines and replacing the empty cell with a cell containing the desired data. Therefore, a node unable to detect the empty cell cannot transmit any information.

SUMMARY OF THE INVENTION

It is an object of the present invention to improve the efficiency of fault monitoring and fault reporting in a ring LAN by using a single kind of monitoring cells periodically passed around transmission lines of the ring LAN or by adding specific information to a synchronous time-division frame to be transmitted over the transmission lines.

In accordance with the present invention, there is provided a communication control method for a network including duplexed ring transmission lines and a plurality of communication controlling devices each accommodating a plurality of terminals and adapted to transmit data sent from any of the terminals and receive data over the ring transmission lines, the communication control method comprising the steps of: causing one communication controlling device to transmit monitoring cells simultaneously over the duplexed transmission lines. the monitoring cells each including a pass indication area for retaining a source address and identification information for identifying a passed communication controlling device; and causing another communication controlling device which receives the monitoring cells respectively from the duplexed transmission lines to relay and circulate the monitoring cells respectively over the duplexed transmission lines after writing in the pass indication area of each of the received monitoring cells data indicative of passage of said each monitoring cell.

BRIEF DESCRIPTION OF THE DRAWINGS

FIG. 5 is a source node reference table according to the present invention;

FIG. 6 is a system selection table according to the present invention;

FIG. 11 is a diagram for explaining an exemplary monitoring table according to the present invention;

FIG. 12 is a diagram for explaining switching conditions to be employed for the switching of a selected system according to the present invention;

FIG. 21 is a status transition table to be used to change the status of a sequential circuit shown in FIG. 20;

FIG. 22 is a table listing values indicative of the number of relay cells to be set in a memory shown in FIG. 20;

FIG. 25 is a diagram for explaining the format of a fault information cell in the prior art;

FIG. 26 is a diagram for explaining the format of a transmission performance monitoring cell in the prior art;

FIG. 27 is a diagram for explaining the format of a configuration information cell in the prior art;

FIG. 29 is a diagram for explaining pass node information contained in monitoring cells according to the present invention;

DETAILED DESCRIPTION OF THE PREFERRED EMBODIMENTS

Figure 1:
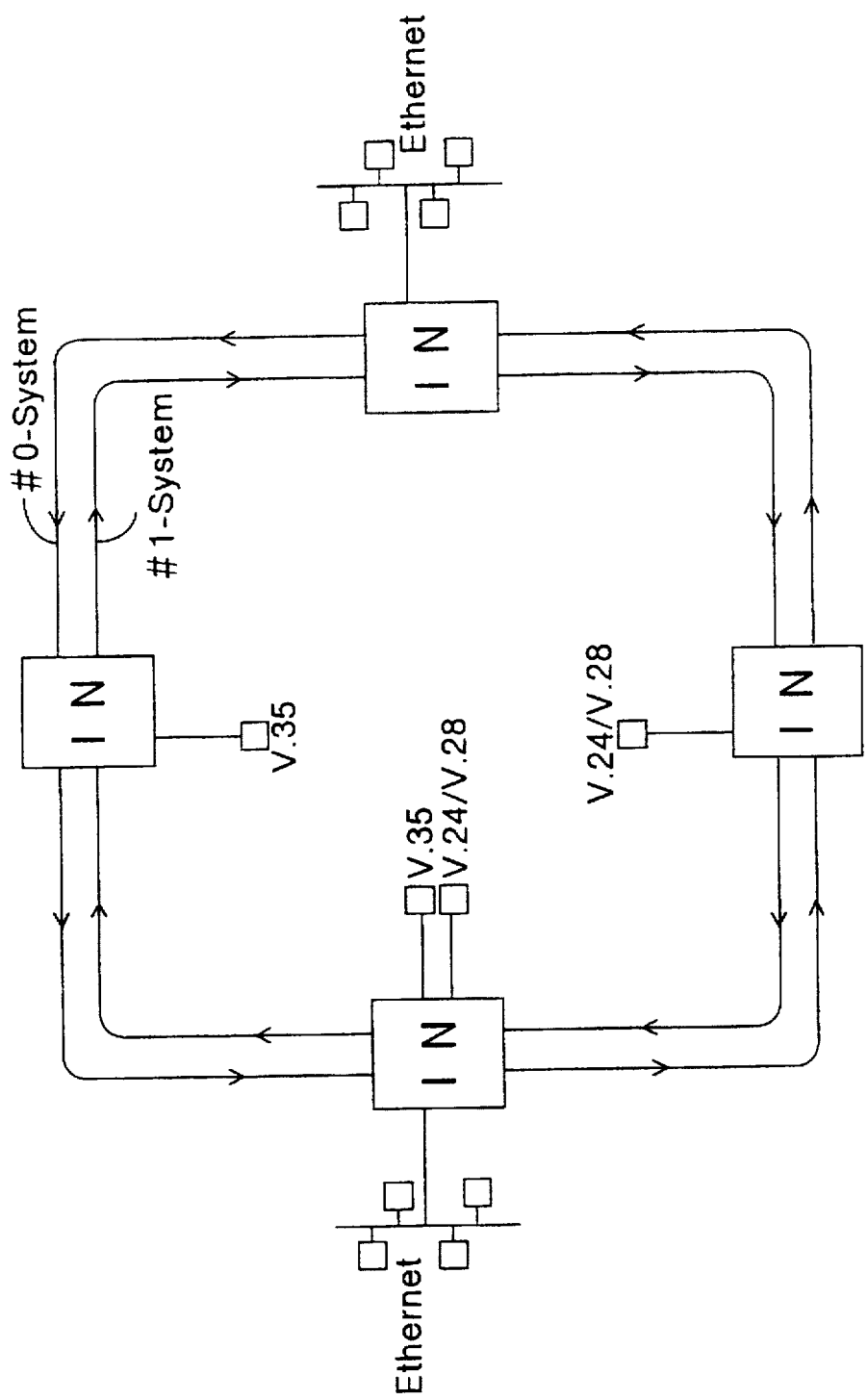
FIG. 1 is a diagram illustrating the system configuration of a ring LAN according to the present invention.

Communication control methods according to the present invention significantly improve the efficiency of fault monitoring and fault reporting in a communication controlling device adapted to multiplex asynchronous data.

The communication control methods according to the present invention are employed in a network including duplexed ring transmission lines and a plurality of communication controlling devices each accommodating a plurality of terminals and adapted to transmit data sent from any of the terminals and receive data over the ring transmission lines.

In a communication control method according to the present invention, one communication controlling device transmits monitoring cells simultaneously over the duplexed transmission lines. The monitoring cells each includes a pass indication area for retaining a source address and identification information for identifying a passed communication controlling device. Another communication controlling device which receives the monitoring cells respectively from the duplexed transmission lines relays and circulates the monitoring cells respectively over the duplexed transmission lines after writing in the pass indication area of each of the received monitoring cells data indicative of passage of the monitoring cell.

The communication controlling devices are preferably each adapted to detect a fault in the duplexed transmission lines by extracting data indicative of passed communication controlling devices from the pass indication areas of the two monitoring cells respectively received over the duplexed transmission lines and comparing the data with each other. The occurrence of a fault may otherwise be detected by a reception time-out (which indicates that the communication controlling device cannot receive the monitoring cells for more than a predetermined period of time).

The aforesaid one communication controlling device preferably erases a monitoring cell received thereby to prevent the monitoring cell from being relayed to an adjacent communication controlling device, if the communication controlling device detects data indicative of passage of the monitoring cell through the communication controlling device being written in a pass indication area of the monitoring cell.

The communication controlling devices preferably each include: a plurality of reception buffers corresponding to the plurality of terminals and each adapted to receive data sent from a corresponding terminal connected thereto; buffer selecting means for checking the amount of data accumulated in each of the reception buffers and selecting a reception buffer retaining the largest amount of data; check means for checking an error of data read-out from the reception buffer selected by the buffer selection means; and fault detecting means for indicating that an error occurs in the data received by the reception buffer or in a connection path connected to a terminal. If an error is detected in the data read out of the reception buffer by the check means, the fault detecting means indicates that the data sent from a terminal corresponding to the reception buffer is abnormal. If a reception buffer is not selected by the buffer selecting means for more than a predetermined period of time, the fault detecting means indicates that a connection path connected to a terminal corresponding to the reception buffer is abnormal.

In a communication control method according to the present invention, a communication controlling device divides data sent from an asynchronous terminal into a plurality of cells having a fixed length by a deviding means, and generates an asynchronous communication frame having a synchronous pattern, a cell accommodating area including the plurality of cells, a check pattern area for transmission line monitoring, and a monitoring area for error detection by a generating means. Then, the communication controlling device generates a synchronous time-division frame including synchronous data sent from a synchronous terminal and the asynchronous communication frame by a second generating means, and transmits the synchronous time-division frame over the duplexed transmission lines.

The check pattern area in the asynchronous communication frame preferably has a source address area for retaining data unique to each communication controlling device. When a communication controlling device is to relay the synchronous time-division frame, the communication controlling device preferably writes data unique thereto in the source address area of the asynchronous communication frame incorporated in the synchronous time-division frame, and transmits the synchronous time-division frame over the transmission lines.

In a communication control method according to the present invention, the communication controlling devices each include a relay buffer for temporarily storing data of relay cells received from the transmission lines, a transmission buffer for storing data sent from any of the terminals, data amount detecting means for detecting the amount of the data stored in the relay buffer and the amount of the data stored in the transmission buffer, output proportion setting means for setting output proportions of data to be outputted from the relay buffer and data to be outputted from the transmission buffer for transmission over the transmission lines on the basis of the amounts of the data stored in the relay buffer and in the transmission buffer detected by the data amount detecting means, and selection controlling means for selecting either the data stored in the transmission buffer or the data stored in the relay buffer on the basis of the output proportions set by the output proportion setting means and transmitting the selected data over the transmission lines. The output proportion setting means variably sets the output proportions of the data to be outputted from the transmission buffer and the data to be outputted from the relay buffer for transmission over the transmission lines.

If the amount of the data of the relay cells stored in the relay buffer which is detected by the data amount detecting means is greater than a predetermined reference value, the output proportion setting means preferably determines the output proportions so as to give priority to the transmission of the relay cells over the transmission lines.

The communication controlling devices to be employed in the present invention are so-called nodes which are connected to the ring transmission lines. The communication controlling devices each controls the transmission and reception of data in the form of a cell or a frame which is transmitted over the ring transmission lines, and performs such operations as the monitoring, reporting and indication of a fault occurring in the ring transmission lines and the switching control of the ring transmission lines.

The plurality of terminals are connected to each communication controlling device via the LAN. The communication controlling device multiplexes data sent from any of these terminals, and transmits the data over the ring transmission lines. Further, the communication controlling device analyzes data passed around the ring transmission lines, and sends the data to a terminal connected thereto.

The communication controlling device preferably includes a CPU, an RAM, an ROM, an I/O interface and control software. More preferably, the communication controlling device includes dedicated LSIs or general-purpose LSIs respectively serving for segmental processing functions thereof in consideration of a processing speed and the like.

The functions of the buffer selecting means, check means and error detecting means are preferably achieved by the CPU, RAM, ROM and the like operating based on control software. Where the control procedure is routinized and a higher processing speed is required, these functions are preferably achieved by hardware such as a dedicated LSI.

Used as the reception buffer, transmission buffer, relay buffer and memory for storing or temporarily retaining data are such memories as an RAM and register.

The functions of the data amount detecting means, output proportion setting means and selection controlling means are preferably achieved by a CPU, an ROM, an RAM and control software or, alternatively, by hardware such as a dedicated LSI.

With reference to the attached drawings, the present invention will hereinafter be described in detail by way of embodiments thereof. It should be understood that the embodiments are not limitative of the present invention.

FIG. 1 is a diagram illustrating an exemplary system configuration of a ring LAN according to the present invention.

The ring LAN includes a plurality of nodes IN and duplexed transmission lines, 0-system and 1-system, connected thereto. Exemplary terminals to be connected to the nodes include an ATM terminal, V.24/28 terminal, V.35 terminal and audio terminal. Exemplary networks to be connected to the nodes include an ethernet and FDDI.

There will be described the transmission function of the ring LAN having such a construction.

One node receives a transmission packet sent from a terminal, and divides the packet into fixed-length cells having a predetermined identifier, which are passed around the ring LAN. For example, a cell accommodating a transmission packet sent from an ATM terminal is called an ATM cell.

Each fixed-length cell is duplicated for simultaneous transmission of the cells over the duplexed transmission lines. The duplicated cells are each incorporated in a predetermined position of a synchronous frame. Then, the synchronous frame is transmitted over the ring LAN. An exemplary synchronous frame to be used is SONET/SDH.

The synchronous frame is configured so as to be divided as desired in a time slot unit and has an asynchronous data area for accommodating the aforesaid fixed-length cells and a synchronous data area for accommodating line data such as of V.24/28, I.430, audio and V.35.

Next, an explanation will be given to the reception function of the ring LAN.

Upon receiving the synchronous frame, a node divides the synchronous frame into a synchronous data area and an asynchronous data area, and then extracts cells from the asynchronous data area. The node judges whether the extracted cells are destined for the node and, if so, receives the cells and stores them in a reception buffer thereof. If not, the node transmits the cells to an adjacent node along with the other transmission cells.

Cells accumulated in the reception buffer of the node are reassembled into the original form of packet data as transmitted from the source terminal, and the resulting packet data is sent to a destination terminal.

Figure 2:
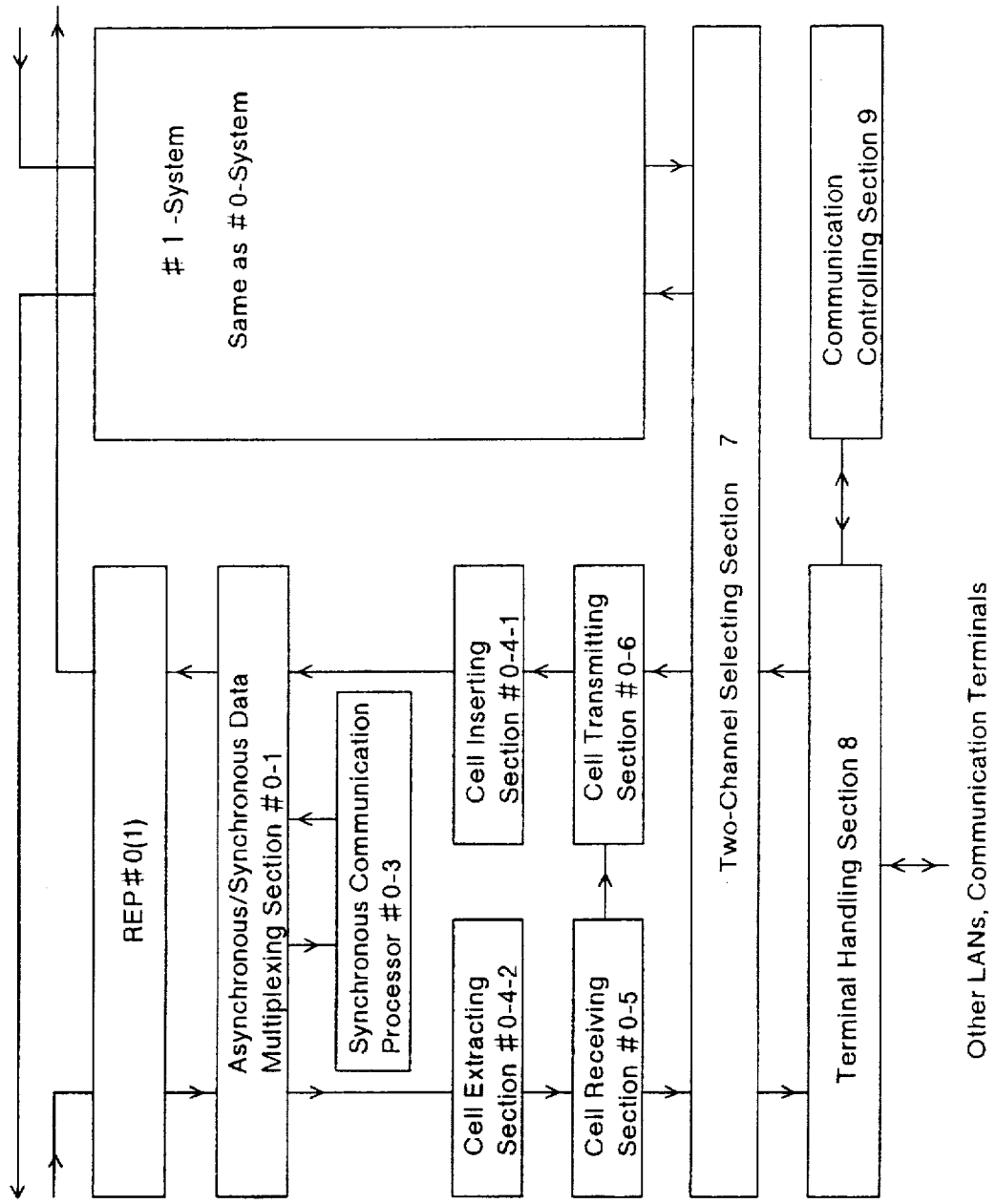
FIG. 2 is a block diagram illustrating the internal construction of a communication controlling device according to the present invention.

FIG. 2 is a block diagram illustrating an exemplary internal construction of the node serving as the communication controlling device accommodated in the ring LAN.

An REP 1 serves as a physical and logical interface to the duplexed transmission lines of the ring LAN.

An asynchronous/synchronous data multiplexing section 2 multiplexes asynchronous data of an ATM cell and synchronous data for a synchronous line. A synchronous communication processor 3 serves as an interface for connecting a synchronous line such as V.24/28 or V.35. A cell inserting section 4-1 inserts a cell into a given time slot of a synchronous frame such as an STM-n frame. A cell extracting section 4-2 extracts a cell from a frame received by the node.

A cell transmitting section 6 selects either a cell sent from a terminal or a cell to be relayed for the transmission thereof over the transmission lines. A cell receiving section 5 extracts an identifier from a predetermined position of a received cell, and determines whether the cell is to be taken into the node or relayed to an adjacent node. A two-channel selecting section 7 has a transmission section and a reception section. The transmission section duplicates a cell sent from a terminal handling section 8 for the 0-system and the 1system, and passes the duplicated cells to the cell transmitting sections 6 of the two systems (#0-system and #1-system). The reception section judges which of the 0-system transmission line and the 1-system transmission line is to be selected for the reception of a cell sent from each source, on the basis of information retained in the predetermined positions of the cells respectively received from the 0-system transmission lines and the 1-system transmission line.

The terminal handling section 8 serves to assemble packets into a cell to be transmitted to a terminal or network resources connected to a node, and to disassemble a received cell into packets. A communication controlling section 9 is comprised of an MPU, an RAM and the like, and controls the operations of the aforesaid components.

Where asynchronous data is extracted from data received from the transmission lines in a node having such a construction, the data is sequentially sent to the REP 1, the asynchronous/synchronous data multiplexing section 2, the cell extracting section 4-2. If the data is destined for the node, the data is sequentially sent to the cell receiving section 5, the reception section of the two-channel selecting section 7 and the terminal handling section 8, and then outputted to a destination terminal. If the data is not destined for the node, the data is sent to the cell transmitting section 6 from the cell receiving section 5 for the relay thereof.

The transmission data sent from a terminal is sent to the cell transmitting section 6 from the terminal handling section 8 via the two-channel selecting section 7.

The cell transmitting section 6 receives the transmission data as well as relay data sent from the cell receiving section 5, and selects either the transmission data or the relay data on the basis of predetermined criteria to transmit the selected data to the cell inserting section 4-1.

The data assembled in the cell inserting section 4-1 is sent to the asynchronous/synchronous data multiplexing section 2 and then to the REP 1 to be outputted to the transmission line.

Figure 3:
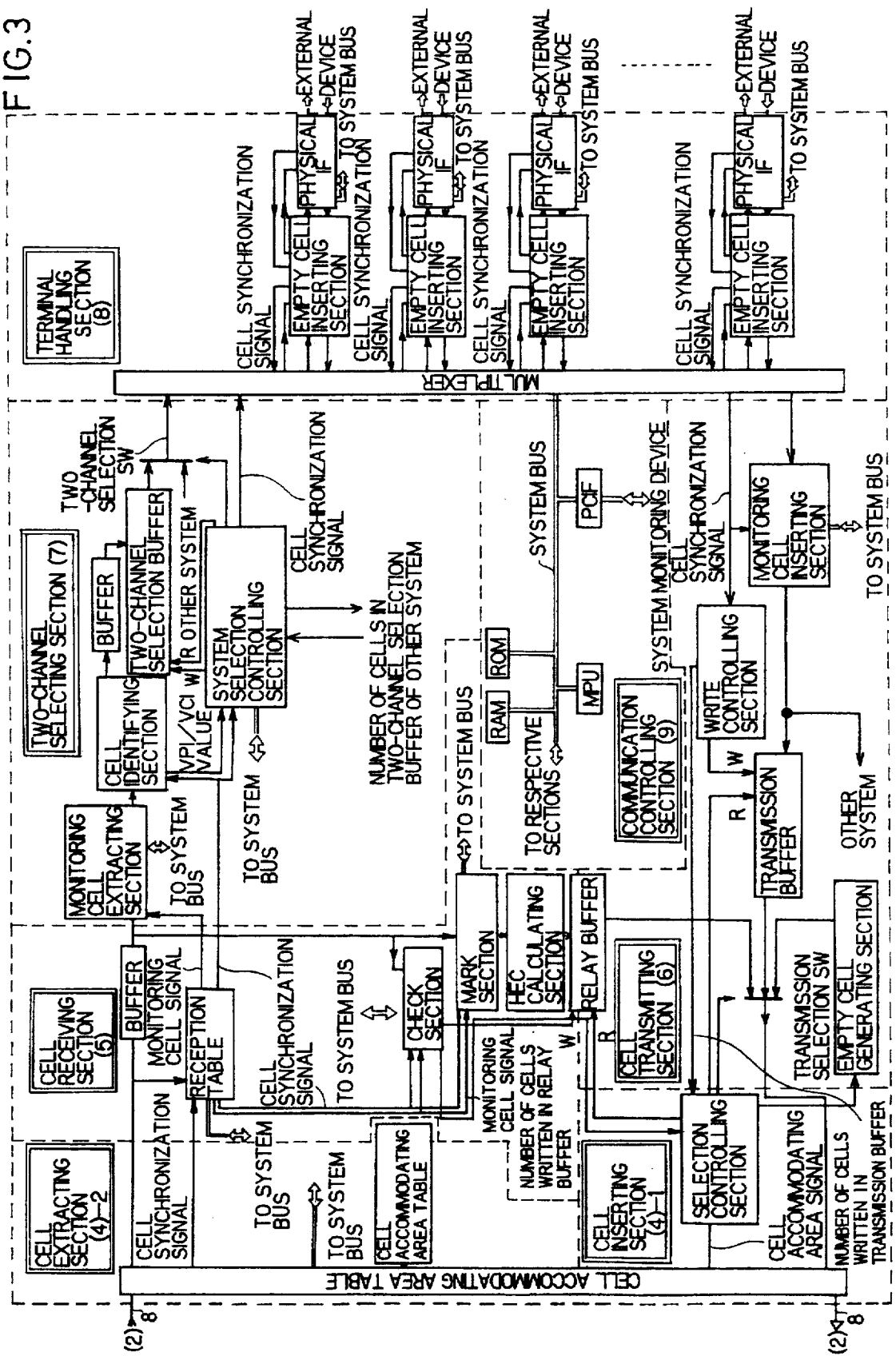
FIG. 3 is a detailed block diagram illustrating the major portion of the communication controlling device shown in FIG. 2.

FIG. 3 is a detailed block diagram illustrating the major portion of the node shown in FIG. 2. The major portion of the node will be described with reference to FIG. 3.

The cell extracting section/cell inserting section 4 includes a cell accommodating area table, a cell accommodating area processing section and a selection controlling section.

The cell accommodating area table is a memory for indicating a cell accommodating area in an STM-1 frame.

The cell accommodating area processing section extracts a cell accommodating area from the STM-1 frame. Based on a synchronous pattern, the cell accommodating area processing section establishes the synchronization with an asynchronous data accommodation frame and outputs to the cell receiving section 5 a cell synchronization signal indicative of the beginning of a cell sequence. Further, the cell accommodating area processing section checks a check pattern in the asynchronous data accommodation frame and, when detecting an error, sends an alarm to the communication controlling section 9. The cell accommodating area processing section also checks an error detecting code in the asynchronous data accommodating frame and, when detecting an error, sends an alarm to the communication controlling section 9. Then, the cell accommodating area processing section relays the check pattern from the cell extracting section to the cell inserting section. The cell accommodating area processing section generates an asynchronous data accommodation frame, and indicates a cell accommodating area in the asynchronous data accommodation frame to the selection controlling section. The cell accommodating area processor generates a check pattern for the node.

The selection controlling section, upon receiving a cell accommodating area signal, checks the number of cells in the relay buffer and the number of cells in the transmission buffer, and reads out cells from either the relay buffer or the transmission buffer. If the numbers of cells in the relay buffer and the transmission buffer are both less than one cell, the selection controlling section directs to generate an empty cell.

The cell receiving section 5 includes a reception table, a check section, a mark section and an HEC calculating section and a relay buffer.

The reception table judges whether the received cell is destined for the node or other nodes, by referring to a VPI/VCI value in a cell header.

The check section checks a multi-circulation monitoring bit 6 (not shown) if the node is designated to be a multi-circulation cell monitoring node. If the multi-circulation monitoring bit is "1", the check section does not write in the relay buffer. The check section monitors the number of cells in the relay buffer.

The mark section writes "1" in a multi-circulation cell monitoring area (not shown) if the node is the multi-circulation cell monitoring node.

The HEC calculating section recalculates data in an HEC area of the cell header when a change is made in the multi-circulation cell monitoring area.

The relay buffer is a buffer for accumulating therein relay cells.

The cell transmitting section 6 includes a transmission selection switch, an empty cell generating section, a transmission buffer, a write controlling section and a monitoring cell inserting section.

The transmission selection switch selects one of the relay buffer, transmission buffer and empty cell generating section based on an instruction from the selection controlling section to output a cell retained in the selected section to the cell extracting section 4-2.

The empty cell generating section generates an empty cell based on an instruction from the selection controlling section.

The transmission buffer is a buffer for accumulating therein transmission cells.

The write controlling section writes a cell in the transmission buffer in response to a cell synchronization signal from a multiplexer, and monitors the number of cells accumulated in the transmission buffer.

The monitoring cell inserting section generates and inserts a monitoring cell based on an instruction from the communication controlling section.

The two-channel selecting section 7 includes a monitoring cell extracting section, a cell identifying section, a system selection controlling section, two-channel selection buffer and a two-channel selection switch.

The monitoring cell extracting section extracts a monitoring cell in response to a monitoring cell signal sent from the reception table. Further, the monitoring cell extracting section accumulates extracted monitoring cells in a memory, and applies an interruption request to the communication controlling section.

The cell identifying section reports information written in the VPI/VCI area of the received cell to the system selection controlling section.

The system selection controlling section accesses a source node reference table as shown in FIG. 5, and obtains an address of a source node based on the VPI/VCI value written in the header of the received cell. Further, the system selection controlling section accesses a system selection table as shown in FIG. 6 based on the address of the source node and, if a current system is selected, writes a cell in the reception buffer. The system selection controlling section checks the numbers of cells in the reception buffers of the #0- and #1-systems, and compares the cell numbers with each other to take out cells from a buffer in which a larger number of cells are accumulated. The system selection controlling section generates a cell synchronization signal to the multiplexer.

The two-channel selection buffer is provided for each of #0- and #1-systems for accumulation of received cells.

The two-channel selection switch selects either the #0-system or the #1-systems based on an instruction from the system selection controlling section to transmit a cell from the selected system to the multiplexer.

The terminal handling section 8 includes the multiplexer, a plurality of empty cell inserting sections and a plurality of physical interfaces.

The multiplexer outputs a cell to a predetermined channel with reference to the VPI/VCI value of the received cell, and outputs synchronization signal to a plurality of OAM cell processing sections not shown. Further, the multiplexer accumulates cells from the OAM cell sections in buffers provided for the respective systems. The multiplexer checks the amounts of cells in the respective buffers, and selects one of the buffers retaining a larger amount of cells to multiplex the cells. Further, the multiplexer checks cells from the respective channels.

The empty cell inserting section inserts an empty cell at predetermined intervals for the monitoring in the multiplexer.

The physical interface adds empty cells to an output cell to generate an STM-1 frame, and incorporates cells in a payload area of the STM-1 frame. Further, the physical interface converts an electrical signal into an optical signal, and vice versa. Still further, the physical interface extracts cells from the payload area of an inputted STM-1 frame, then deletes empty cells, and sends the residual cells to an OAM cell processing section in response to a cell synchronization signal.

The communication controlling section 9 includes MPU/ROM/RAM and a PCIF.

The MPU/ROM/RAM controls the aforesaid sections 4 to 8 of the node. By observing the arrival interval of monitoring cells, the MPU/ROM/RAM detects a fault in the transmission line. If a fault is detected in the transmission line, the MPU/ROM/RAM rewrites part of the system selection table in the system selection controlling section to switch the system. Further, the MPU/ROM/RAM reports the state of the node to an external system monitoring device for information to a user.

The PCIF is an interface for transmitting a node state signal from the MPU to the system monitoring device.
EMBODIMENT 1

There will be described the format of a monitoring cell, an operation to be performed in a node to output monitoring cells to the ring LAN, and the like.

Figure 4:
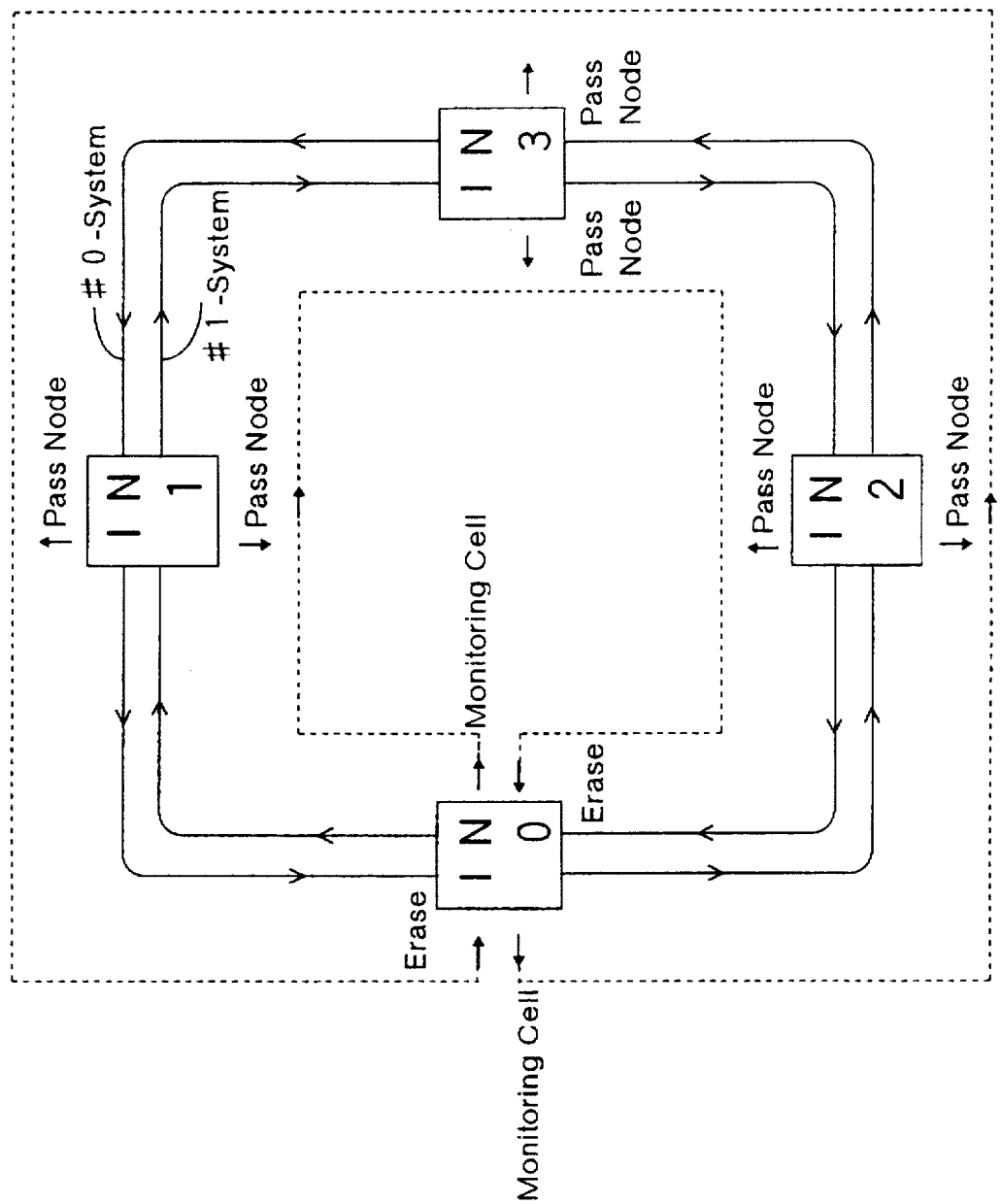
FIG. 4 is a diagram for explaining the operational principal of a ring LAN according to EMBODIMENT 1 of the present invention.

FIG. 4 is a diagram illustrating an operational principal of the ring LAN in accordance with EMBODIMENT 1.

As shown by a dotted line in FIG. 4, monitoring cells are outputted from a node IN0 over the #0- and #1-system transmission lines.

The monitoring cell outputted to the #0-system transmission line passes through nodes IN1, IN3 and IN2, then returns to the node IN0, and is erased. The monitoring cell outputted to the #1-system transmission line passes through the nodes IN2, IN3 and IN1, then returns to the node IN0, and is erased. Monitoring cells are periodically outputted at predetermined intervals. Upon receiving a monitoring cell, the nodes IN1, IN2 and IN3 each write node information in the monitoring cell to indicate that the monitoring cell passes therethrough.

Each node can detect and report a fault occurring in the transmission lines by monitoring the monitoring cell to be periodically transmitted thereto and checking the pass node information. Further, each node can know the configuration of nodes incorporated in the ring LAN.

The operation in accordance with EMBODIMENT 1 will hereinafter be described in detail.

Figure 7:
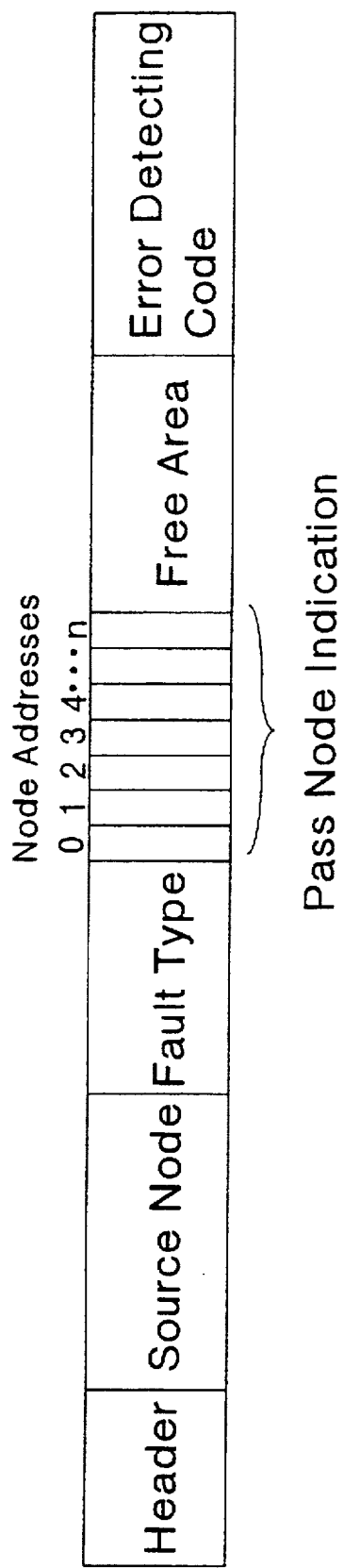
FIG. 7 is a diagram for explaining the format of a monitoring cell to be used in the present invention.

FIG. 7 illustrates the format of the monitoring cell. The monitoring cell has a header, a source node area, a fault type area, a pass node indication area and an error detection code area.

The header retains a unique VPI/VCI value for distinguishing the monitoring cell from user cells. The VPI and VCI, which are specified by the ITU-T recommendation I.361, are employed as labels for identifying VP and VC to which the cell belongs.

The source node area retains the address of a source node, and the fault type area retains data indicative of the presence of a fault, the type of the fault and the like. The pass node indication area retains data indicative of nodes through which the monitoring cell has passed, and an error detecting code serves for error detection.

The pass node indication area includes, for example, one-bit areas assigned for respective nodes. When a monitoring cell passes through a node n, the node n writes "1" in a one-bit area corresponding to the node n in the pass node indication area. A node which receives the monitoring cell can know nodes through which the monitoring cell has passed, by checking one-bit areas flagged with "1" in the pass node indication area.

Figure 8:
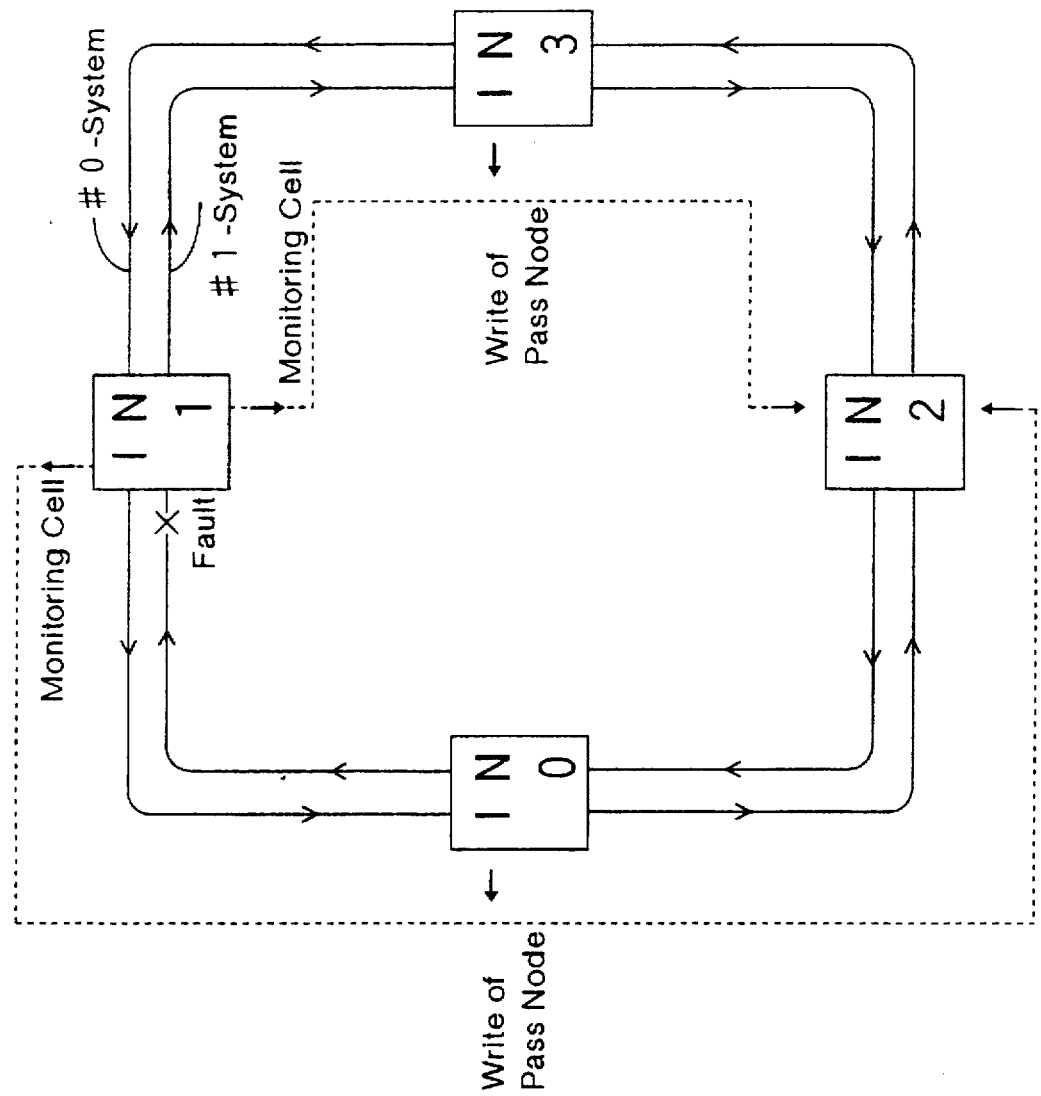
FIG. 8 is a diagram for explaining an exemplary fault detection method according to the present invention.

With reference to FIG. 8, an explanation will be given to an exemplary fault detection process to be performed when a fault occurs in a transmission line.

It is herein assumed that a fault occurs on the #1-system transmission line between the nodes IN0 and IN1. The node IN1 monitors the #1-system transmission line for a predetermined time period and recognizes that data cannot be received from the #1system transmission line.

Upon detecting the data reception impossible state, the node IN1 outputs monitoring cells each retaining fault information written in the predetermined position thereof as shown in FIG. 7 to the other nodes over the #0- and #1-system transmission lines. Even if a fault that prevents the write of fault information in a monitoring cell occurs in a node, the fault can be detected as a monitoring cell cannot be received from nodes upstream of the faulty node.

A node which has received a monitoring cell writes "1" in a bit position for the node in the pass node indication area of the monitoring cell to indicate that the node received the monitoring cell, and relays the monitoring cell to an adjacent node. When the node IN2 receives monitoring cells transmitted from the node IN1 over the #0- and #1-system transmission lines, for example, the node IN2 checks the pass node indications in the monitoring cells. At this time, the node IN2 recognizes that the monitoring cell transmitted from the node IN1 over the #0-system transmission line has passed through the node IN0 and the monitoring cell transmitted from the node IN1 over the #1-system transmission line has passed through the node IN3.

Therefore, by receiving the monitoring cells, the node IN2 recognizes that the fault occurs on a transmission line and that the node IN2 can transmit data to the nodes IN1 and IN3 over the #0-system transmission line and to the node IN0 over the #1-system transmission line. The transmission line is switched so that the node IN2 can use the #0-system transmission line to transmit data to the node IN1 or IN3 and use the #1-system transmission line to transmit data to the node IN0.

Similarly, the transmission line is switched so that the node IN2 can use the #1-system transmission line to receive data from the node IN1 or IN3 and use the #0-system transmission line to receive data from the node IN0.

Thus, the detection and reporting of a fault in the transmission lines can be achieved by passing monitoring cells of a single kind around the duplexed transmission lines and checking the pass node indications in the monitoring cells. The fault detection and fault reporting by using a single kind of monitoring cells reduce the data amount in the transmission lines, thereby improving the use efficiency of the transmission lines and shortening the time required for the detection of a fault in the transmission lines.

Figure 9:
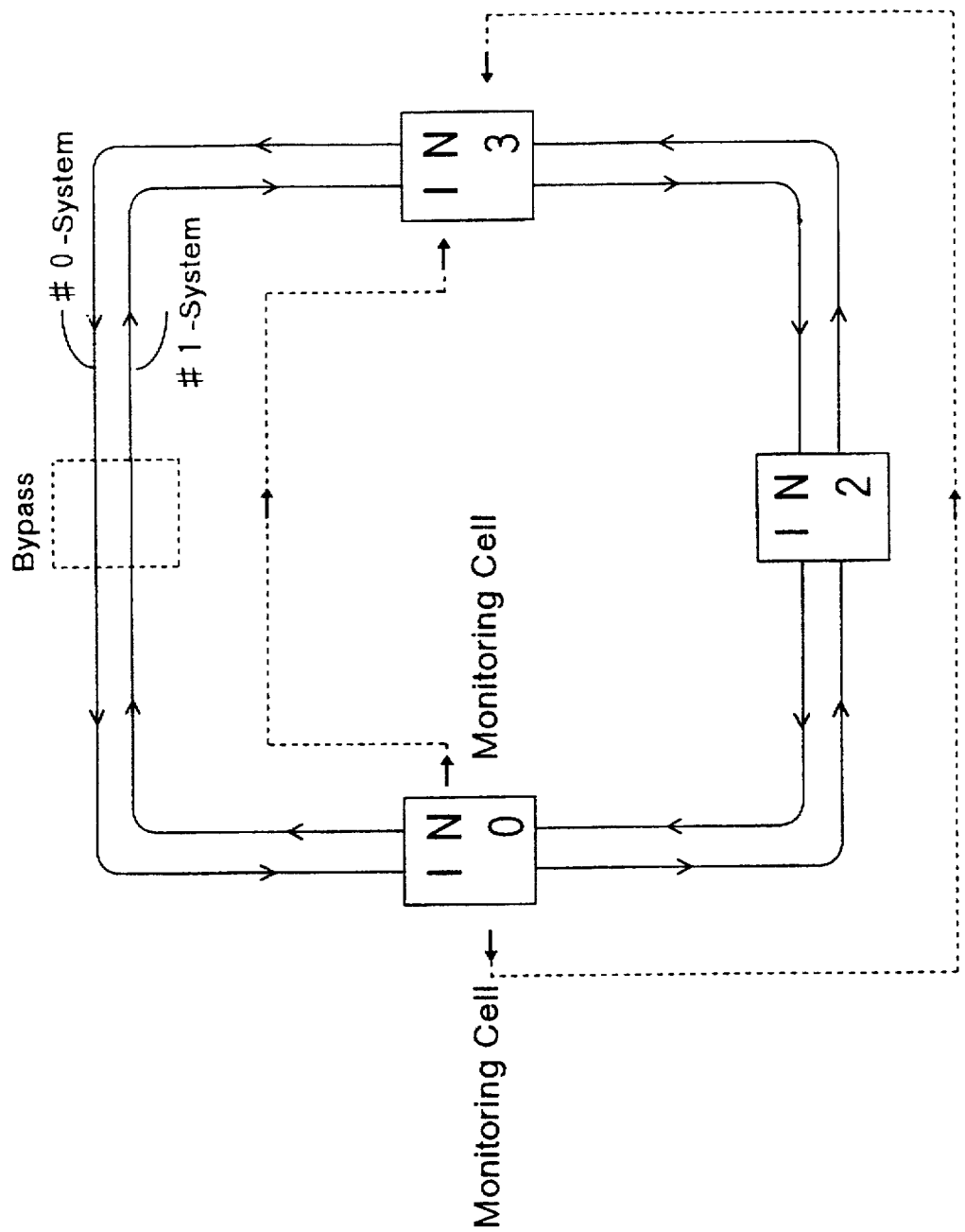
FIG. 9 is a diagram for explaining an exemplary node bypass detection method according to the present invention.

With reference to FIG. 9, there will next be described an exemplary process for the detection of a so-called node bypass which occurs when a node (herein assumed to be the node IN1) is not available due to a power failure or the like. It is herein assumed that monitoring cells are periodically transmitted from the respective nodes.

The node IN3 recognizes that "1" is not written in a pass node indication bit corresponding to the node IN1 in a monitoring cell received from the #1-system transmission line.

If the node IN1 normally operates, the pass node indication bit corresponding to the node IN1 would be flagged with "1". Thus, the node IN3 recognizes that the node bypass of the node IN1 has occurred, by detecting the pass node indication bit being not flagged with "1".

Therefore, this node bypass detection process requires a shorter period of time than a process in which the node bypass is detected by periodically checking the missing of a monitoring cell. The monitoring cell is erased by a source node when the monitoring cell returns to the source node after circulating around the ring transmission line once.

Where the node bypass occurs in the source node, the monitoring cell circulates around the transmission line more than once. This reduces the transmission efficiency of the transmission line.

To avoid such an event, each node checks the pass node indication bit corresponding thereto in a monitoring cell. If "1" is written in the pass node indication bit, the node preferably erases the monitoring cell so as not to relay the monitoring cell.

Figure 10:
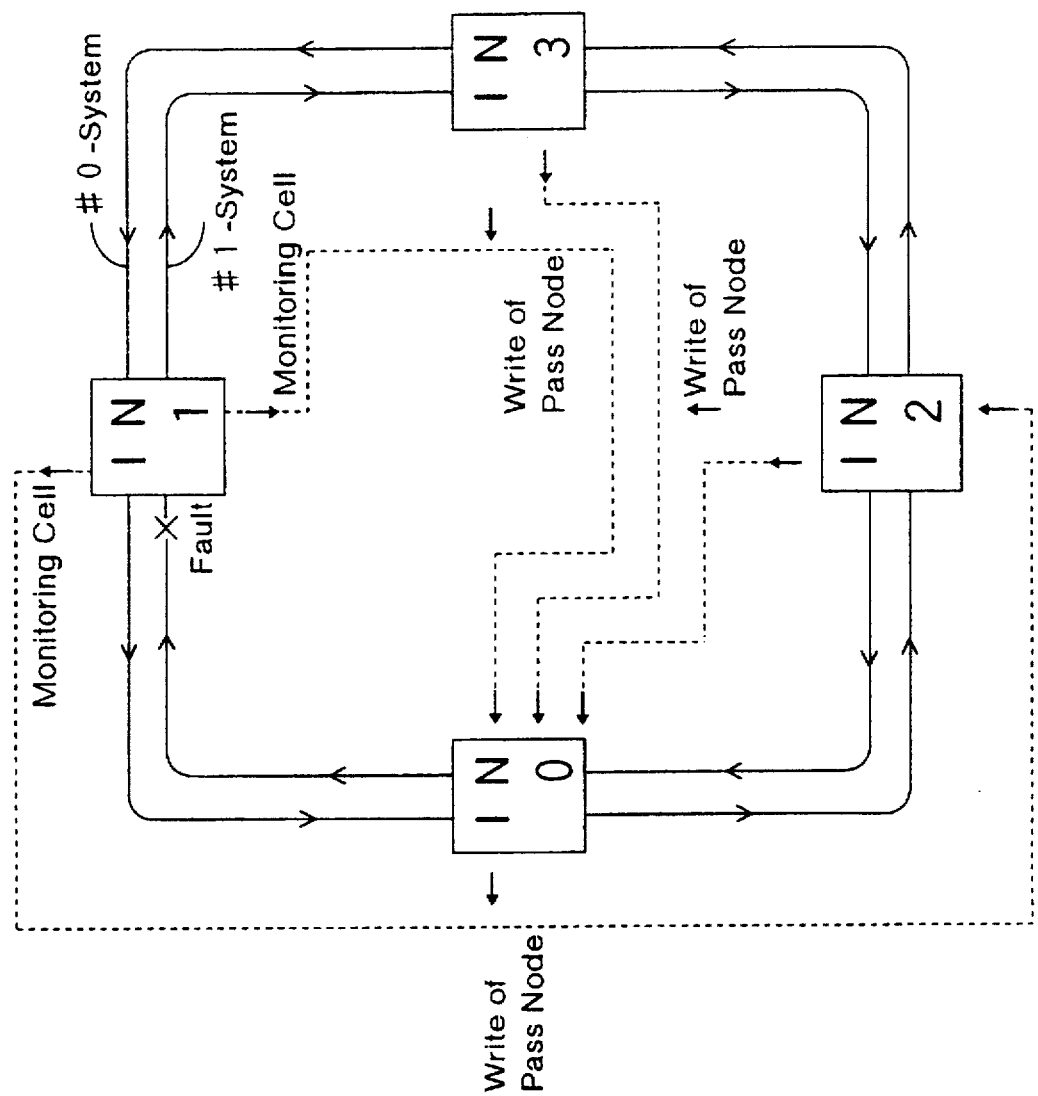
FIG. 10 is a diagram for explaining an exemplary method for perceiving a node configuration according to the present invention.

With reference to FIG. 10, an explanation will be given to an exemplary method for perceiving the node configuration in the ring LAN.

For example, by checking a monitoring cell transmitted from the node IN1 over the #1-system transmission line, the node IN0 recognizes that there exist nodes IN2 and IN3 between the nodes IN1 and IN0.

More specifically, when the monitoring cell passes through the nodes IN2 and IN3, "1" is written in the pass node indication bits corresponding to these nodes in the monitoring cell. Therefore, by checking the address (IN1 in this case) of the source node and the pass node indication in the monitoring cell, the node IN0 recognizes the existence of the nodes IN2 and IN3 between the nodes IN1 and IN0.

Similarly, the node IN0 recognizes that there exists the node IN2 between the nodes IN3 and IN0, by checking a monitoring cell transmitted from the node IN3 over the #1-system transmission line.

Further, the node IN0 recognizes that there is no node between the nodes IN0 and IN2, by checking a monitoring cell transmitted from the node IN2 over the #1-system transmission line.

Thus, by checking the addresses of the source nodes and the pass node indication bits in the aforesaid three monitoring cells, the node IN0 can know that the nodes IN1, IN3 and IN2 are connected in this order to a reception path on the #1-system transmission line.

Similarly, by checking monitoring cells transmitted over the #0-system transmission line, the node IN0 can know the node configuration along a reception path on the #0-system transmission line.

As described above, each node can know the node configuration in the ring LAN by checking the addresses of the source nodes and the pass node indication bits in the monitoring cells without using a special cell for the determination of the node configuration in the ring LAN.

Since this method does not use such a special cell, the use efficiency of the transmission lines can be improved.

There will be described another exemplary method for perceiving the node configuration.

Figure 28:
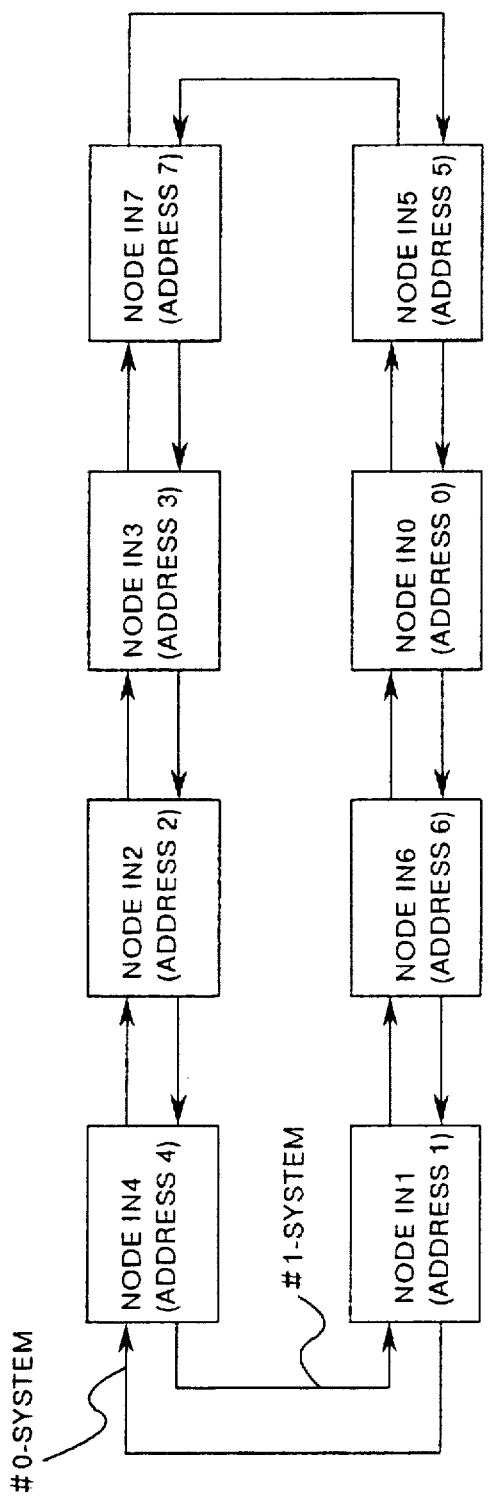
FIG. 28 is a diagram illustrating an exemplary node configuration of a ring LAN according to the present invention.

As shown in FIG. 28, eight nodes IN0 to IN7 having node addresses "0" to "7" are incorporated in a ring LAN.

It is herein assumed that a node IN2 having an address 2 observes monitoring cells received thereby over the #0-system transmission line. The node IN2 receives eight monitoring cells MC1 to MC8 each having different pass node information as shown in FIG. 29.

For example, the pass node indication bits corresponding to the node addresses "0", "1", "4", "5", "6" and "7" in a monitoring cell MC3 are flagged with "1". This indicates that the monitoring cell MC3 has passed through the nodes IN0, IN1, IN4, IN5, IN6 and IN7. The number N of passed nodes is six. The node configuration in the ring LAN can be determined by comparing pass node information in the different monitoring cells.

Figure 30:
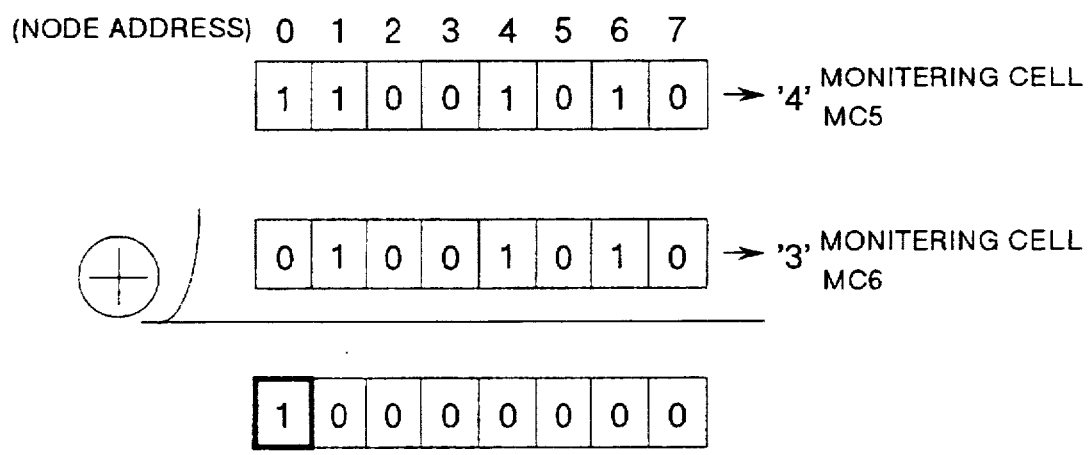
FIG. 30 is a diagram for explaining an operation of exclusive-ORing the monitoring cells shown in FIG. 29.

As shown in FIG. 30, monitoring cells MC5 and MC6 are selected among the received monitoring cells, and the pass node indication bits in the monitoring cell MC5 are exclusiveORed with the corresponding node indication bits in the monitoring cell MC6. The numbers of pass nodes indicated in the monitoring cells MC5 and MC6 are four and three, respectively. As a result of the exclusive-OR operation, "1" resides only in a bit position of the node address "0" as shown in FIG. 30. This means that the node address of the fourth node counting upstream from the node IN2 (address "2") on the #0-system transmission line is "0".

In general, by exclusive-ORing pass node indication bits in monitoring cells respectively having pass node numbers N and N-1, the address of the N-th node counting upstream from the node which has received the monitoring cells can be determined. Therefore, the node configuration in the ring LAN can be determined by performing the aforesaid operation on all the received monitoring cells.

Next, an explanation will be given to an exemplary communication control process in which the current transmission line is switched in a reception node when the node becomes unable to receive a monitoring cell which is to be otherwise periodically received thereby.

The communication control is performed by the system selection controlling section in the two-channel selecting section 7 and the communication controlling section 9 in a reception node shown in FIG. 3 and the like.

First, the operation of the system selection controlling section will be described. It is herein assumed that the system selection controlling section includes the source node reference table shown in FIG. 5 and the system selection table shown in FIG. 6.

The source node reference table shows the relationship between the VPI/VCI of a cell and the source node. The system selection controlling section retrieves from the source node reference table a VPI/VCI corresponding to a VPI/VCI value written in a cell transmitted from the cell receiving section 5 to determine the address of a source node.

The system selection table shows the relationship between the source node and the selected system. For example, #0-system is selected to receive a cell from a source node having an address "00h" as shown in FIG. 6. Thus, which system is currently used for the reception from the source node can be determined by referring to the system selection table shown in FIG. 6.

Where it is determined by referring the system selection table shown in FIG. 6 that the #0-system (i.e., current system) is currently selected to receive a user cell transmitted over the #0-system transmission line, for example, the system selection controlling section stores the received user cell in the two-channel selection buffer for the #0-system. On the other hand, where the #0-system is not selected, the received user cell is not stored in the two-channel selection buffer, but erased. The monitoring cell is erased in the monitoring cell extracting section.

The received user cells are accumulated in two-channel selection buffers for the #0-system and #1-system. Then, the system selection controlling section checks the numbers of cells accumulated in the two-channel selection buffers for the #0-system and #1-system, and reads out the user cells from one of the two-channel selection buffers for the #0-system and the #1-system which retains a larger number of cells.

At this time, the system selection controlling section switches the two-channel selection switch to select a system which retains a larger number of cells in the two-channel selection buffer thereof in order to output the cells read out of the selected system to the multiplexer of the terminal handling section 8.

There will next be explained the operation of the communication controlling section 9. It is herein assumed that the communication controlling section 9 has a monitoring table as shown in FIG. 11 in the RAM thereof, wherein "ADDRESS" means the address of a source node, "COUNTER" means a monitoring cell reception timeout counter, and "RECEPTION STATE" means whether the reception state is normal or abnormal and is represented by "0" (when a monitoring cell is normally received) or "1" (when a monitoring cell is not received for more than a predetermined period of time).

The communication controlling section 9 accesses the monitoring table at predetermined time intervals to decrement the counter by one. When, the value of the counter becomes "0", the communication controlling section 9 considers that a fault occurs in the current transmission line, and applies to the system selection controlling section an instruction to switch the system currently selected in accordance with the system selection table.

When the count value becomes "0", switching conditions to be employed for the switching of the system is shown in FIG. 12. As shown in FIG. 12, where the #0-system is normal and the #1-system is abnormal, for example, the #0-system is selected regardless of the previous state thereof.

As described above, the system switching for reception of the monitoring cell on the side of the reception node eliminates the need for transmitting system selection information to the source node, thereby allowing for prompt system switching and improving the use efficiency of the transmission lines.

There will next be explained an exemplary method for detecting in the terminal handling section 8 a fault caused due to line breakage or erroneous connection. The fault detection is performed by the multiplexer of the terminal handling section 8.

Figure 13:
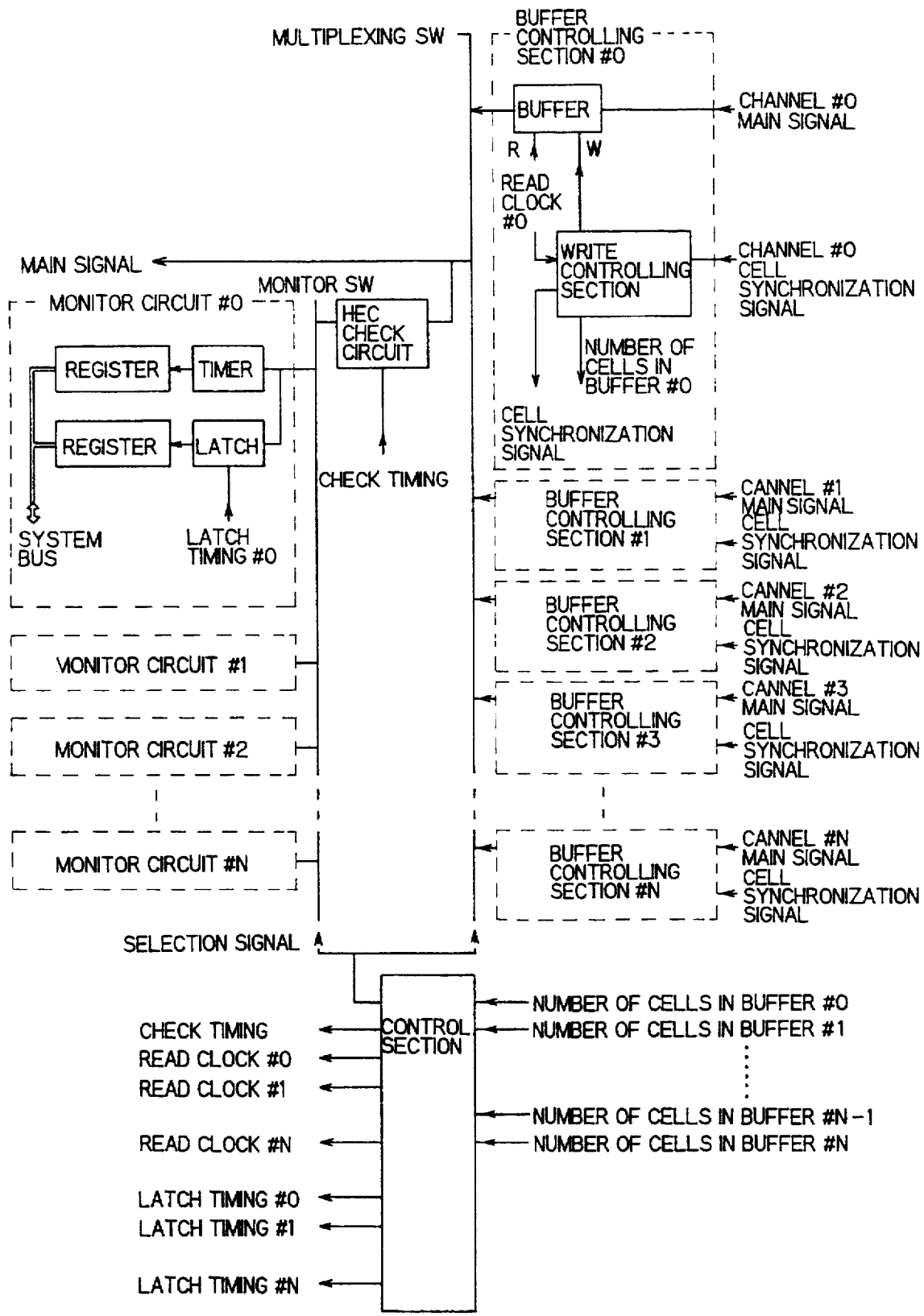
FIG. 13 is a block diagram illustrating the internal construction of a multiplexer according to the present invention.

FIG. 13 is a block diagram illustrating the internal construction of the multiplexer, in which the channel #0 to #N mean transmission lines connected to terminals (external devices), the main signal means data received from the terminals, and the cell synchronization signal means a frame pulse indicative of the beginning of a cell sequence.

The multiplexer includes buffer controlling sections each having a buffer and a write controlling section, a multiplexing switch, a control section, a HEC check circuit, monitor circuits each having a timer, a latch and registers, and a monitor switch.

The multiplexing switch and the control section serve as buffer selecting means, and the HEC check circuit serves as check means for checking an error. The monitoring circuits, the monitor switch and the control section serve as fault detecting means.

The buffer is a so-called reception buffer for temporarily accumulating therein cells for a corresponding channel. The write controlling section generates a write clock signal for the write in the buffer in synchronization with a cell synchronization signal indicative of the beginning of a cell sequence. The multiplexing switch is used when a cell is multiplexed for the respective channels. The HEC check circuit is a CRC operation circuit for checking the HEC of a cell header, and generates a negative pulse when the operation result is normal. The timer is a mono/multi timer which is reset by a pulse from the HEC check circuit. The latch latches a state in response to a latch timing signal, and generates an alarm if the state is "1" when the latch timing signal is applied thereto. The register is a flip-flop circuit for applying an alarm to the communication controlling section. The control section checks the numbers of cells in the buffers of the respective buffer controlling sections, and selects a buffer retaining the largest number of cells. Simultaneously with the selection of the buffer, the control section outputs a selection signal, a check timing signal, a read clock and a latch timing signal. The monitor switch is used to select a monitoring circuit (timer and latch) to which the result of HEC check for a cell is outputted.

Figure 32:
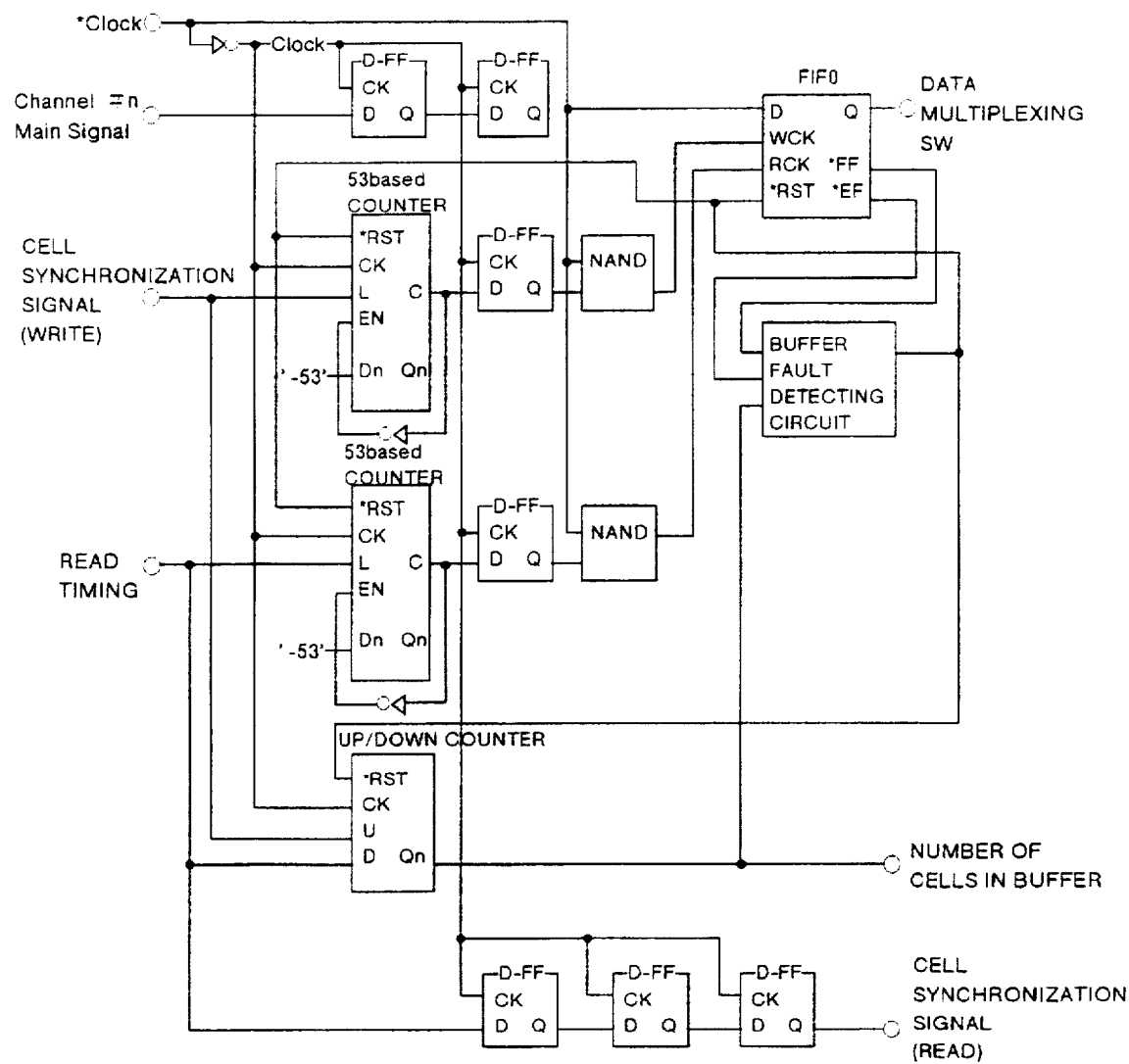
FIG. 32 is a block diagram illustrating an exemplary construction of a buffer controlling section shown in FIG. 13.

FIG. 32 illustrates an exemplary construction of the buffer controlling section (#0 to #N) shown in FIG. 13. The buffer controlling section includes 53-based counters, an up/down counter and a buffer fault detecting circuit. The 53based counters each modify a read timing signal and cell synchronization signal to change the width thereof from a oneclock width to a width corresponding to one cell. The up/down counter counts the number of cells in the buffer. The buffer fault detecting circuit checks whether the buffer is full or empty, and resets the buffer.

Next, an explanation will be given to an exemplary operation for fault detection in each channel which is to be performed by the multiplexer having the aforesaid construction. It is herein assumed that a cell is received from one channel #S and one or more cells are accumulated in a buffer #S.

Referring to FIG. 13, the write controlling section #S writes one cell in the buffer #S in response to the reception of a cell synchronization signal. At this time, the write controlling section increments by one the counter for counting the number of cells in the buffer #S.

Then, the control section compares the numbers of cells in the respective buffers (#0 to #N), and outputs a read clock to a buffer retaining the largest number of cells for reading one cell therefrom. The read clock is also applied to the write controlling section. At this time, the write controlling section generates a cell synchronization signal for reading a cell. Further, the write controlling section reads one cell from the buffer in response to the read clock and decrements by one the counter for counting the number of cells in the buffer.

The control section switches the multiplexing switch and the monitor switch in response to a selection signal. Further, the control section applies a check timing signal to the HEC check circuit, and a latch timing signal to the timer and the latch circuit.

As described above, the fault detection in the plurality of channels can be achieved by using a single check circuit and, therefore, the circuit construction of the multiplexer can be simplified.

EMBODIMENT 2

There will hereinafter be described an exemplary process for generating a synchronous time-division frame by combining an asynchronous communication frame and synchronous data and transmitting the synchronous time-division frame to the ring transmission lines.

In this embodiment, an STM frame is used as the synchronous data. Exemplary data to be transmitted from an asynchronous terminal include an ATM cell, ethernet frame and FDDI frame. It is herein assumed that an ATM cell is incorporated in a given time slot of the STM frame (synchronous data) and a transmission line fault is to be detected by utilizing data in a predetermined area of the STM frame. This fault detection process requires a shorter period of time than the aforesaid fault detection using a monitoring cell.

Figure 14:
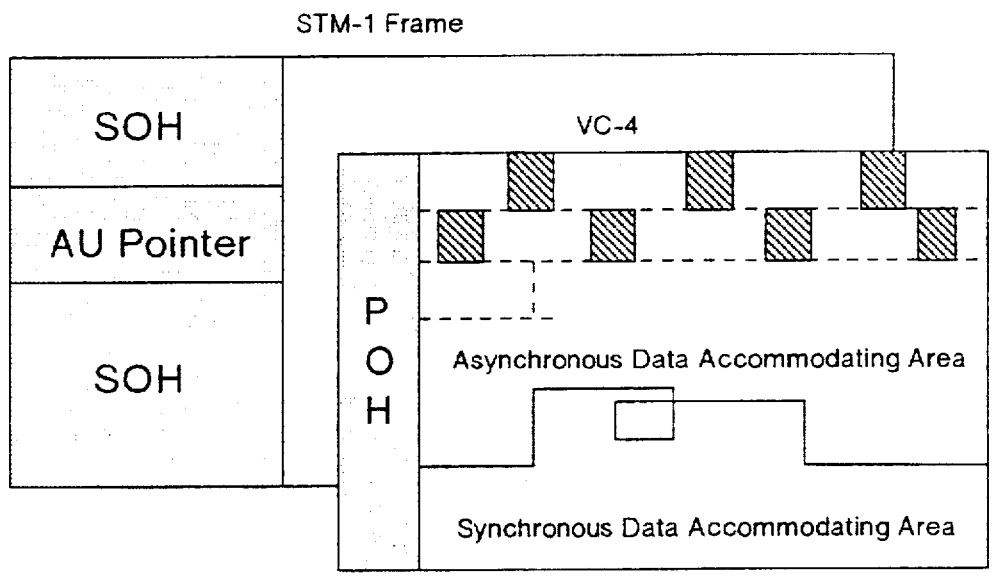
FIG. 14 is a diagram illustrating the format of an STN-n frame according to the present invention.

FIG. 14 illustrates the format of the STN-n frame (synchronous time-division frame) which is transmitted as one sell from each node over the ring transmission lines.

The synchronous time-division frame includes an SOH serving as a header area of the STM-n frame, an AU pointer for pointing a POH's J1-bite position, and a POH serving as a header area of a VC-4 15 frame. These are specified by the ITU-T recommendation G.707 to G.709. The "n" of the STM-n frame means that the communication speed is 155.52×N Mbps.

The synchronous data sent from a synchronous terminal and the asynchronous communication frame sent from an asynchronous terminal are accommodated in an area of the VC-4 frame other than the POH.

Referring to FIG. 14, the area other than the POH is divided into a synchronous data accommodating area for accommodating synchronous data and an asynchronous data accommodating area for accommodating asynchronous data in desired proportions.

More specifically, the synchronous data accommodating area and asynchronous data accommodating area can be located in desired positions in the VC-4 frame by provision of a counter for indicating a time slot position in the VC-4 frame and a memory storing a flag indicative of which of the synchronous data and the asynchronous data is accommodated therein. Therefore, the asynchronous communication frame can be accommodated in a desired time slot in the STM-n frame. This means that the band widths of the synchronous data and asynchronous data can be set as desired.

Figure 15:
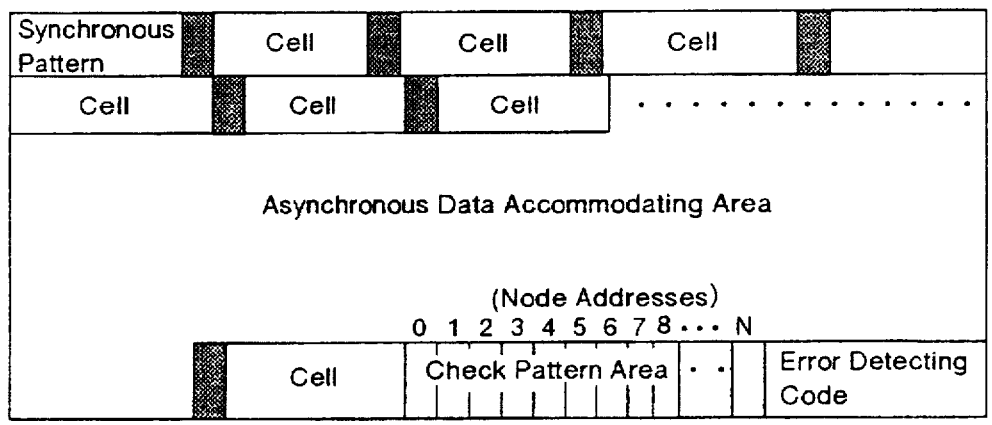
FIG. 15 is a diagram illustrating the format of an asynchronous data accommodating area shown in FIG. 14.

FIG. 15 illustrates the format of the asynchronous data accommodating area in the VC-4 frame. As shown in FIG. 15, the asynchronous data accommodating area includes a synchronous pattern, a cell area for accommodating a plurality of asynchronous communication frames (cells) sent from respective asynchronous terminals, a check pattern area, and an error detecting code area.

The synchronous pattern indicates the beginning of the asynchronous data accommodating area, and includes F/inverted F pattern (e.g., an alternating pattern of B6 and inverted B6). The cell area accommodates asynchronous communication frames (cells) to be actually transmitted. The check pattern area is accessed by one node to check if the other nodes in the ring LAN operate normally. The check pattern area includes a plurality of segmental areas corresponding to respective nodes incorporated in the ring LAN. Where n nodes are incorporated in the ring LAN, for example, the check pattern area is segmented into n areas.

Figure 16:
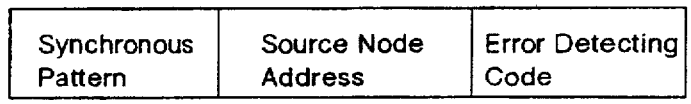
FIG. 16 is a diagram illustrating the format of a check pattern area shown in FIG. 15.

FIG. 16 illustrates the format of the segmental check pattern area for each node. As shown in FIG. 16, each segmental area includes, for example, a synchronous pattern, a source node address area and an error detecting code area.

The synchronous pattern shown in FIG. 16 indicates the beginning of the segmental check pattern area which is used for establishing the synchronization of the check pattern, and includes F/inverted F pattern (e.g., an alternating pattern of B6 and inverted B6).

The source node address area retains the address of a source node which has written a cell in the asynchronous data accommodating area. By referring to the source node address, it can be checked whether the source node which has written this source node address operates normally.

The error detecting codes shown in FIGS. 15 and 16 are used to detect an error in the data to be transmitted. Parity check data such as horizontal parity and vertical parity, a CRC code and the like are preferably employed as the error detecting codes.

The error detecting code of FIG. 15 is determined from data ranging from the synchronous pattern to the data in the check pattern area shown in FIG. 15. The error detecting code of FIG. 16 is determined from the synchronous pattern and the source node address shown in FIG. 16.

By adding these error detecting codes to the frame, it can be readily judged in which section a data error has occurred, the transmission lines, the REP 1, the asynchronous/synchronous data multiplexing section 2 or the cell extracting/inserting section 4.

More specifically, where an error is detected by checking an error detecting code in B1 or B2 bite of the SOH or in B3 bite of the POH, it is determined that the data error is caused due to a fault in the transmission lines or the REP 1. Where an error is detected by checking the error detecting code of FIG. 16, it is determined that the data error is caused due to a fault in the transmission lines, the REP 1, the asynchronous/synchronous data multiplexing section 2 or the cell extracting/inserting section 4. Therefore, where the data error is detected only on the basis of the former case, the transmission lines or the REP 1 malfunctions. Where the data error is detected only on the basis of the latter case, the synchronous/asynchronous data multiplexing section 2 or the cell extracting/inserting section malfunctions.

There will hereinafter be described an exemplary process for monitoring the transmission lines by outputting a synchronous time-division frame having the aforesaid format to the transmission lines.

When one node in the ring LAN is to relay a synchronous time-division frame as shown in FIG. 14, the node writes data as shown in FIG. 16 (check pattern) in a segmental check pattern area corresponding to the node in the frame.

The address of a source node which has transmitted the frame to be relayed by the relay node is written in the source node address area of the check pattern. When relaying the frame, the relay node checks segmental check pattern areas other than that corresponding to the relay node to judge whether a normal check pattern is written in the check pattern area.

More specifically, the relay node checks the source node address areas for respective nodes in the check pattern area. If the source node address is written in a predetermined bit position, the relay node determines that the check pattern is normal. On the other hand, if the source node address is not written in the predetermined bit area, the relay node determines that the check pattern is erroneous.

Where it is determined that an error detecting code in one segmental check pattern area is erroneous, it is considered that a fault occurs in one system during the communication with the source node corresponding to the segmental check pattern. At this time, if the other system is normal, the communication system connected to the source node is switched to the other system.

Since the fault on the transmission lines can be detected by checking the check pattern in a received frame as described above, this fault detection process requires a shorter time than the fault detection process using monitoring cells.

Where an STM-1 frame (synchronous time-division frame) accommodates a single asynchronous communication frame having a check pattern length of 24 bits and three-step pattern synchronization protection is employed, for example, a time of 125×24×3=6 ms is required for the fault detection, provided that it takes 125 us to check one bit. At this time, the band to be used for one check pattern is 8 kbps.

Where the same band as in the aforesaid fault detection process is used to realize the fault detection process with monitoring cells, the monitoring cells are inserted at a time interval of 53 ms (424/8 ms) because each cell comprises 424 bits. In consideration of delay fluctuation and protection from a monitoring cell reception time-out, time required for the fault detection may be several times 53 ms.

That is, the fault detection process using the check pattern requires a shorter time. Since a fault can be quickly detected, the system can be promptly switched, thereby improving the reliability of data transmission at the occurrence of the fault.

The aforesaid operation for the fault detection is performed in the cell extracting/inserting section 4, particularly in the cell accommodating area processing section shown in FIG. 3 in each node.

Figure 17:
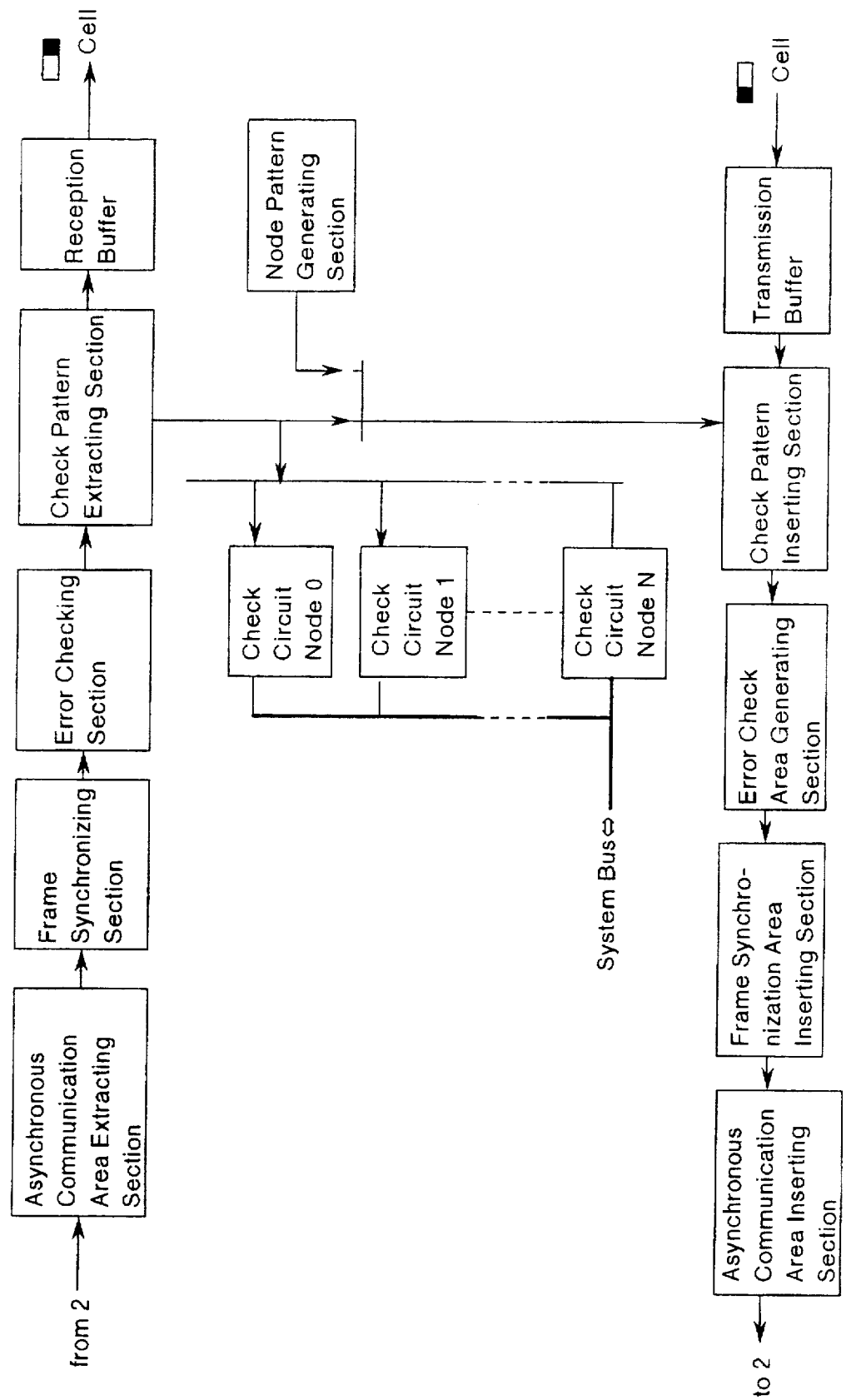
FIG. 17 is a block diagram illustrating the construction of a cell accommodating area processing section according to the present invention.

FIG. 17 is a block diagram illustrating an exemplary construction of the cell accommodating area processing section.

The cell extracting section 4-1 includes an asynchronous communication area extracting section, a frame synchronizing section, an error checking section, a check pattern extracting section and a reception buffer. A cell received from the asynchronous/synchronous data multiplexing section 2 is processed in these sections in the order named above, and transmitted to the cell receiving section 5. The cell extracting section 4-1 further includes check circuits and a node pattern generating section.

The cell inserting section 4-2 includes a transmission buffer, a check pattern inserting section, an error check area generating section, a frame synchronization area inserting section and an asynchronous communication area inserting section. A cell transmitted from the cell transmitting area 6 is processed in these sections in the order named above and transmitted to the asynchronous/synchronous data multiplexing section 2.

The asynchronous communication area extracting section extracts an asynchronous communication frame from a time-division frame. The frame synchronizing section establishes the synchronization of the extracted asynchronous communication frame. The error checking section checks an error in the frame by using an error checking area in the asynchronous communication frame. If an error is detected, the error checking section reports the error to the communication controlling section, in which a process such as the switching of a reception system is thereafter performed. The check pattern extracting section extracts a check pattern area from the asynchronous communication frame. The reception buffer reassembles cells discretely accommodated in the time-division frame, and generates a cell synchronization signal.

The node pattern generating section generates a check pattern for the node. The check circuits each checks a check pattern for a corresponding node. If an error is detected, the check circuit reports the error to the communication controlling section, in which a process such as the switching of a reception system is thereafter performed.

The transmission buffer accumulates therein transmission cells, which are thereafter read out in synchronization with the insertion thereof into an asynchronous communication frame. The check pattern inserting section inserts a check pattern into the asynchronous communication frame. The error check area generating section generates an error check area for the asynchronous communication frame. The frame synchronization area inserting section adds a frame synchronization area to the asynchronous communication frame. The asynchronous communication area inserting section inserts the asynchronous communication frame into the time-division frame in synchronization with a timing signal indicative of the beginning of the time-division frame.

Figure 18:
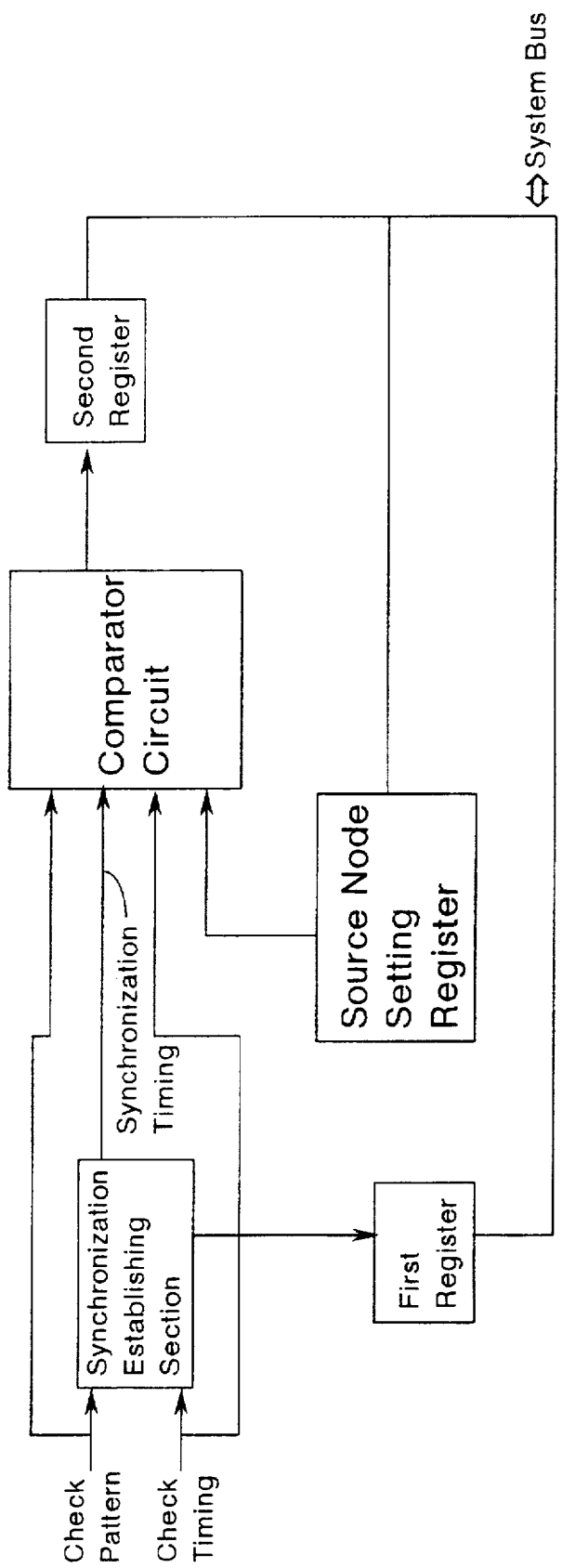
FIG. 18 is a block diagram illustrating an exemplary construction of a check circuit according to the present invention.

FIG. 18 is a block diagram illustrating an exemplary construction of the check circuit.

The check circuit includes a synchronization establishing section, a comparator circuit, first and second registers and a source node setting register.

The synchronization establishing section establishes synchronization between a check pattern signal and a check timing signal. If stepping-out occurs, the synchronization establishing section reports the stepping-out to the communication controlling section. The comparator circuit compares the address of a source node in the check pattern with a value set for the source node. The first and second registers report the establishment of the synchronization and the comparison result of the source node address, respectively, to the communication controlling section. The source node setting register retains a source node address to be compared with that in the check pattern.

The check pattern signal extracted in the check pattern extracting section and a check timing signal obtained from the frame synchronizing section are inputted into the synchronization establishing section, whereby synchronization is established therebetween. The value of the source node address retained in the source node setting register is compared with that in the check pattern in synchronization with a synchronization timing signal obtained from the synchronization establishing section, and the comparison result is retained in the second register. The comparison result is reported to the communication controlling section 9 via a system bus.

Figure 31:
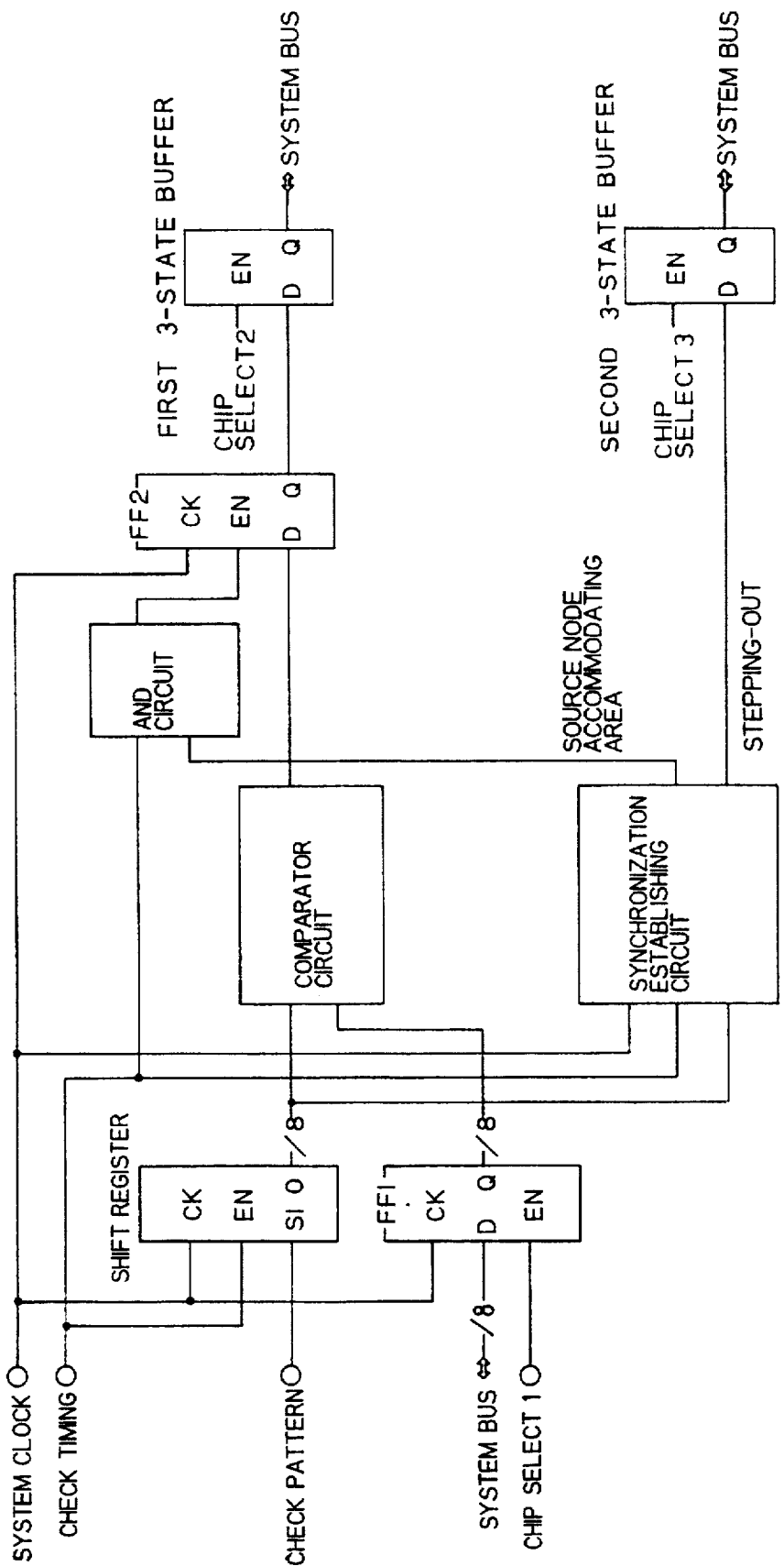
FIG. 31 is a diagram illustrating a more specific example of the check circuit shown in FIG. 18.

FIG. 31 illustrates a more specific example of the check circuit shown in FIG. 18.

The check circuit includes a shift register, a register FF1, a flip-flop FF2, a synchronization establishing circuit, and first and second three-state buffers.

The shift register converts the check pattern (serial data) into 8-bit parallel data. The register FF1 retains a source node address to be checked which is sent from the communication controlling section. If a synchronization pattern is not incorporated in the check pattern, the synchronization establishing circuit generates a stepping-out signal which is sent to the communication controlling section via the second three-state buffer to report thereto the stepping-out. The flip-flop FF2 latches the comparison result outputted from the comparator circuit in a such timing that the check timing signal is ANDed with a signal indicative of the source node address accommodating area generated by the synchronization establishing circuit. The latched comparison result is reported to the communication controlling section via the first three-state buffer.

A fault in the transmission lines is detected when the communication controlling section receives a comparison result indicative of the mismatch of the signals.

Since the synchronous data and asynchronous communication frame are accommodated in the synchronous time-division frame having the check pattern area as described above, quicker detection of a transmission line fault can be realized, thereby allowing the transmission line to be more promptly switched to the other system when the fault is detected.

EMBODIMENT 3

There will hereinafter be described an exemplary method for controlling the transmission of a cell over the ring LAN.

Two kinds of cells, i.e., a transmission cell and a relay cell, are transmitted from a cell over the ring LAN. The transmission cell is a cell transmitted from a source node over a transmission line. The relay cell is a cell transmitted to one node from another node and to be transmitted to still another node without being taken in by the one node.

An explanation will be given to a transmission control method which improves the transmission efficiency by variably setting the proportions of the transmission cells and relay cells to be outputted to the transmission line.

The cell transmitting section 6 and the selection controlling section of the cell inserting section 4 shown in FIG. 3 are mainly involved in this transmission control method.

Figure 19:
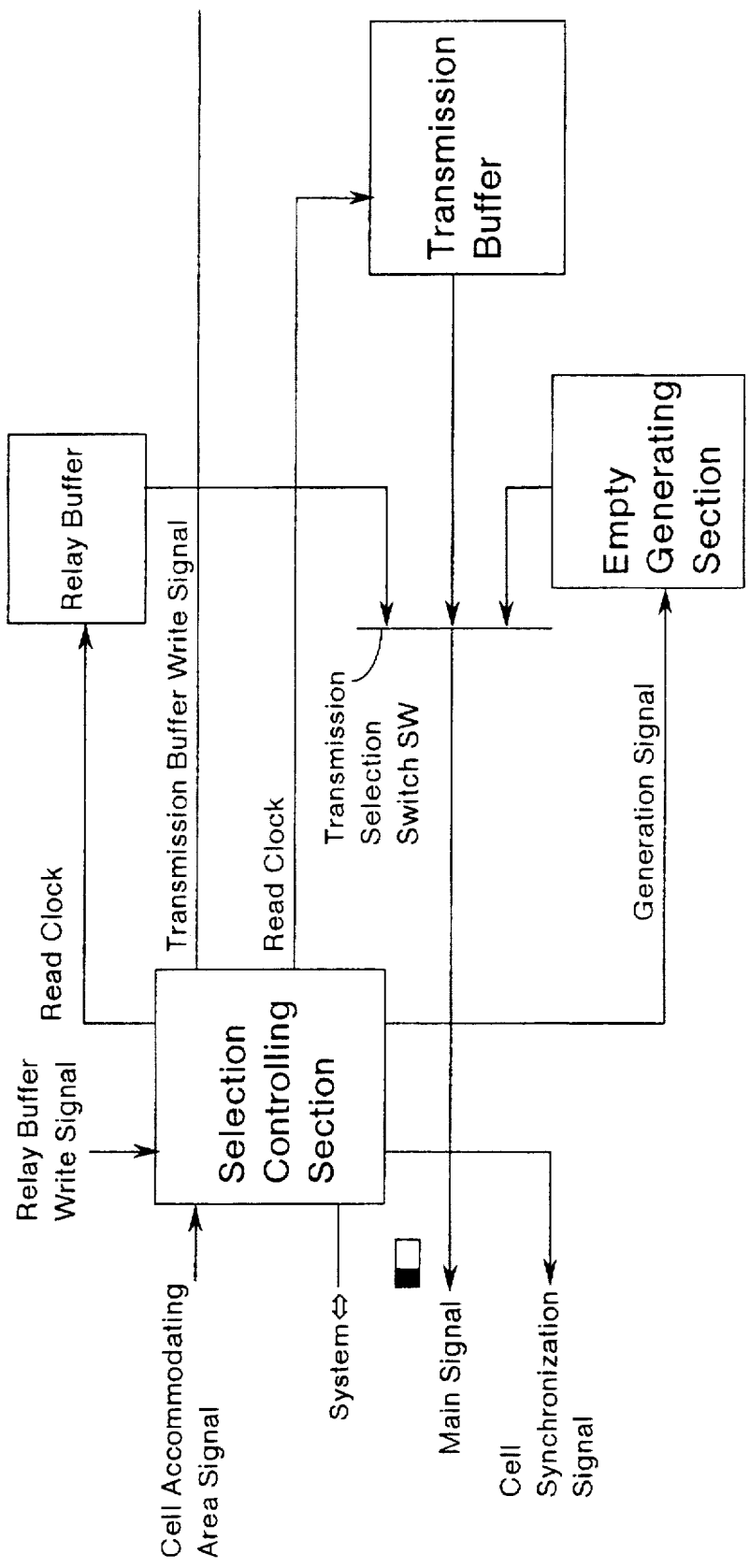
FIG. 19 is a block diagram illustrating the construction of a cell transmitting section and a selection controlling section of a cell inserting section according to the present invention.

FIG. 19 is a block diagram illustrating the construction of the cell transmitting section 6 and the selection controlling section of the cell inserting section 4.

The functions of the respective sections involved in this transmission control method are explained below. The relay buffer accumulates relay cells therein. The transmission buffer accumulates transmission cells therein. The empty cell generating section generates an empty cell on the basis of an instruction from the selection controlling section to adjust the transmission speed of the transmission line when any cell exists neither in the transmission buffer nor in the relay buffer. The transmission selection switch selects any one of cells in the relay buffer, cells in the transmission buffer and an empty cell. The selection controlling section checks the numbers of cells in the transmission buffer and cells in the relay buffer, and selects any one of cells in the transmission buffer, cells in the relay buffer and an empty cell on the basis of a selection parameter set by the communication controlling section 9.

Where priority levels are assigned to the respective cells in the relay buffer and transmission buffer, the relay buffer and the transmission buffer are respectively ready to present cells of the highest and the second highest priority levels. A buffer which has the highest priority cell among these cells is preferably selected first.

The selection controlling section serves as the selection controlling means for selecting and transmitting data from either the transmission buffer or the reception buffer, and the communication controlling section 9 serves as the data amount detecting means and the output proportion setting means.

Figure 20:
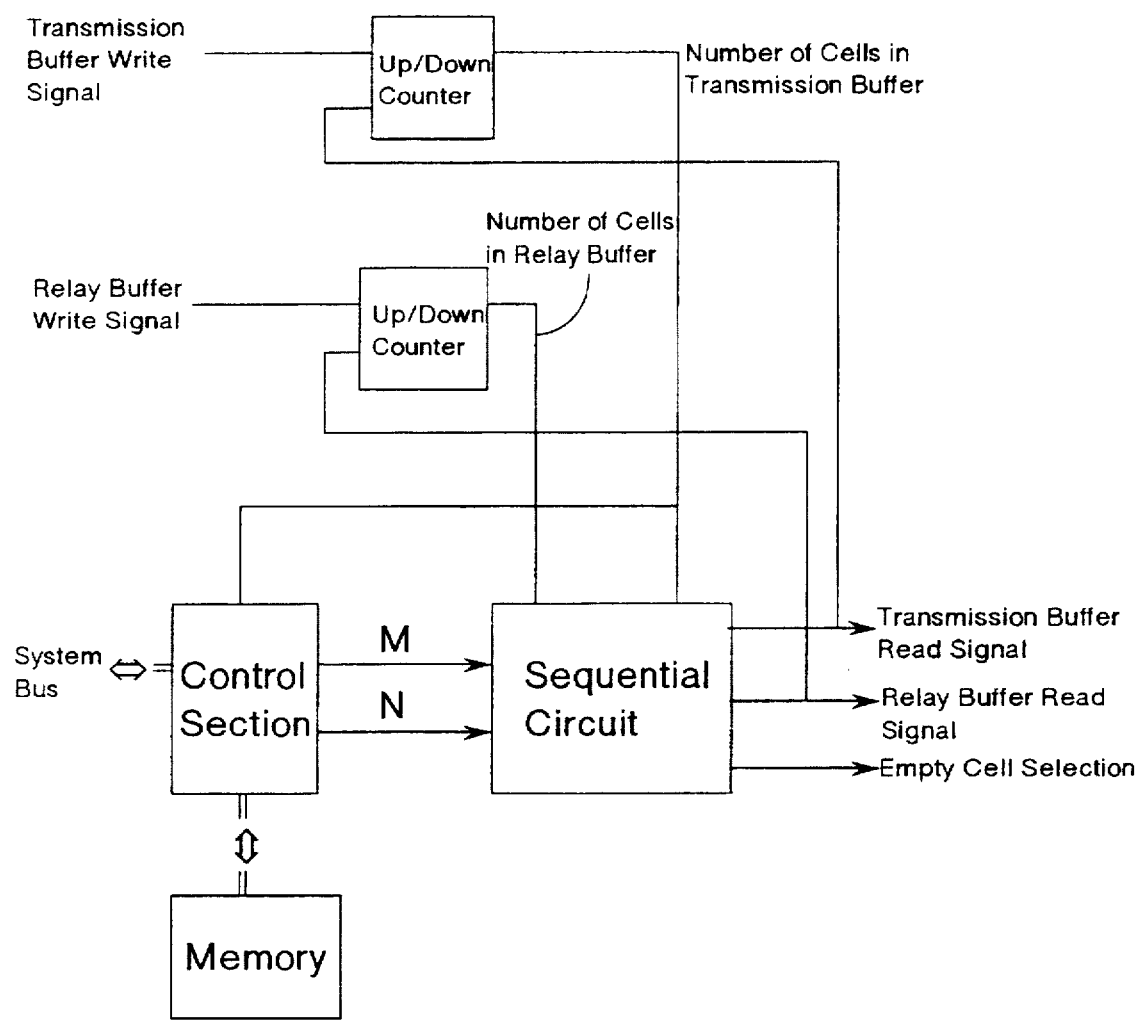
FIG. 20 is a block diagram illustrating the internal construction of the selection controlling section according to the present invention.

FIG. 20 is a block diagram illustrating an exemplary internal construction of the selection controlling section.

The selection controlling section includes a control section, a memory and a sequential circuit. The control section accesses the memory based on an address signal indicative of the number of cells in the relay buffer to obtain the number M of relay cells and the number N of transmission cells, which are reported to the sequential circuit. Further, the control section changes the data in the memory based on an instruction from the communication controlling section. The memory outputs the number M of relay cells and the number N of transmission cells according to the number of cells in the relay buffer on the basis of an instruction from the control section. The sequential circuit checks the numbers of cells in the relay buffer and cells in the transmission buffer, and changes its status in accordance with a status transition table shown in FIG. 21 to select an empty cell or a cell from the transmission buffer or the relay buffer. In FIG. 21, m and n are values of counters in the relay buffer and the transmission buffer, respectively.

FIG. 22 shows the number M of relay cells and the number N of transmission cells which are preliminarily stored in the memory. The numbers M and N are preliminarily set by an operator by using an external input device. The ratios of the transmission cell number and the relay cell number to the number of cells to be transmitted over the transmission line are expressed as N/M+N and M/M+N, respectively.

Referring to FIG. 22, where the value of the address signal, i.e., the number of cells in the relay buffer, is between 10 and 19, the ratio of the relay cell number to the transmission cell number for transmission is 2:8.

FIG. 21 is a status transition table to be used to change the status of the sequential circuit.

"PRESENT STATUS" means a present cell selection status in a node. Where the node is in a status as indicated in "PRESENT STATUS" and a condition as indicated in "CONDITIONS" is satisfied, the present status of the node is changed as indicated in "NEXT STATUS". "ACTION" means an operation to be performed on internal parameters m and n.

For example, where "PRESENT STATUS"="SELECT RELAY BUFFER", and the value m of the counter in the sequential circuit is not equal to M, the status is maintained at "SELECT RELAY BUFFER" as indicated in "NEXT STATUS"and the counter is incremented by one (or m+1 is substituted for m) as indicated in "ACTION". Where "PRESENT STATUS"="SELECT RELAY BUFFER", and a condition of "EMPTY" is satisfied, the status is changed to "SELECT TRANSMISSION BUFFER" as indicated in "NEXT STATUS", and the counter is reset (or m=0). Where "TRANSMIT EMPTY CELL" is selected as "NEXT STATUS", the relay buffer and the transmission buffer have no cell, so that an empty cell is transmitted to adjust the transmission speed.

The empty cell has a unique identifier (e.g., VPI is all-zero, and VCI is all-zero).

Referring to FIG. 19, a transmission buffer write signal is applied from the write controlling section of the cell transmitting section 6. A relay buffer write signal is applied from the check section of the cell receiving section 5. A cell accommodating area signal is applied from the cell accommodating area processing section. The selection controlling section applies to the relay buffer and the transmission buffer a read clock defining a timing of read from these buffers. A generation signal defining a timing of generation of an empty cell is applied to the empty cell generating section.

There will next be described an exemplary method for selecting cells and variously setting the selection ratios of respective kinds of cells (i.e., transmission cells and relay cells to be selected for the transmission thereof over the transmission lines) in the selection controlling section.

The selection controlling section checks the transmission buffer and the relay buffer shown in FIG. 19 to obtain the numbers of cells in the transmission buffer and cells in the relay buffer.

The control section shown in FIG. 20 accesses the memory based on an address defined by the number of cells in the relay buffer thus obtained to read the number M of relay cells and the number N of transmission cells which are preliminarily written in the address of the memory, and sends the numbers M and N to the sequential circuit.

The sequential circuit changes its status as shown in FIG. 21, based on the cell numbers thus obtained (i.e., the relay cell number M, the transmission cell number N and the numbers of cells in the relay buffer and cells in the transmission buffer). On the basis of the status transition, the buffer to be selected next is determined. Thus, an empty cell or a cell from the transmission buffer or from the relay buffer is selected.

The selection ratios of transmission cells and relay cells may be variably set, for example, in a direct proportion to the amount of data accumulated in the relay buffer. Alternatively, the selection ratios may be nonlinearly changed so that a larger amount of relay cells are transmitted where a large amount of data is accumulated in the relay buffer and a smaller amount of relay cells are transmitted where a small amount of data is accumulated in the relay buffer.

Figure 23:
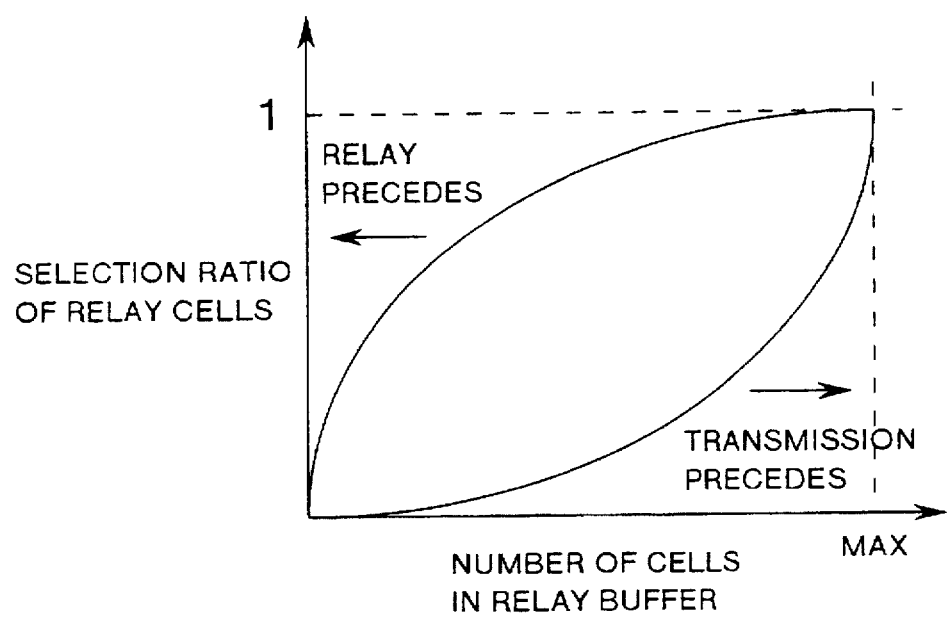
FIG. 23 is a graphical representation illustrating the variable relation between a selection ratio and the number of cells in a relay buffer.
Figure 24:
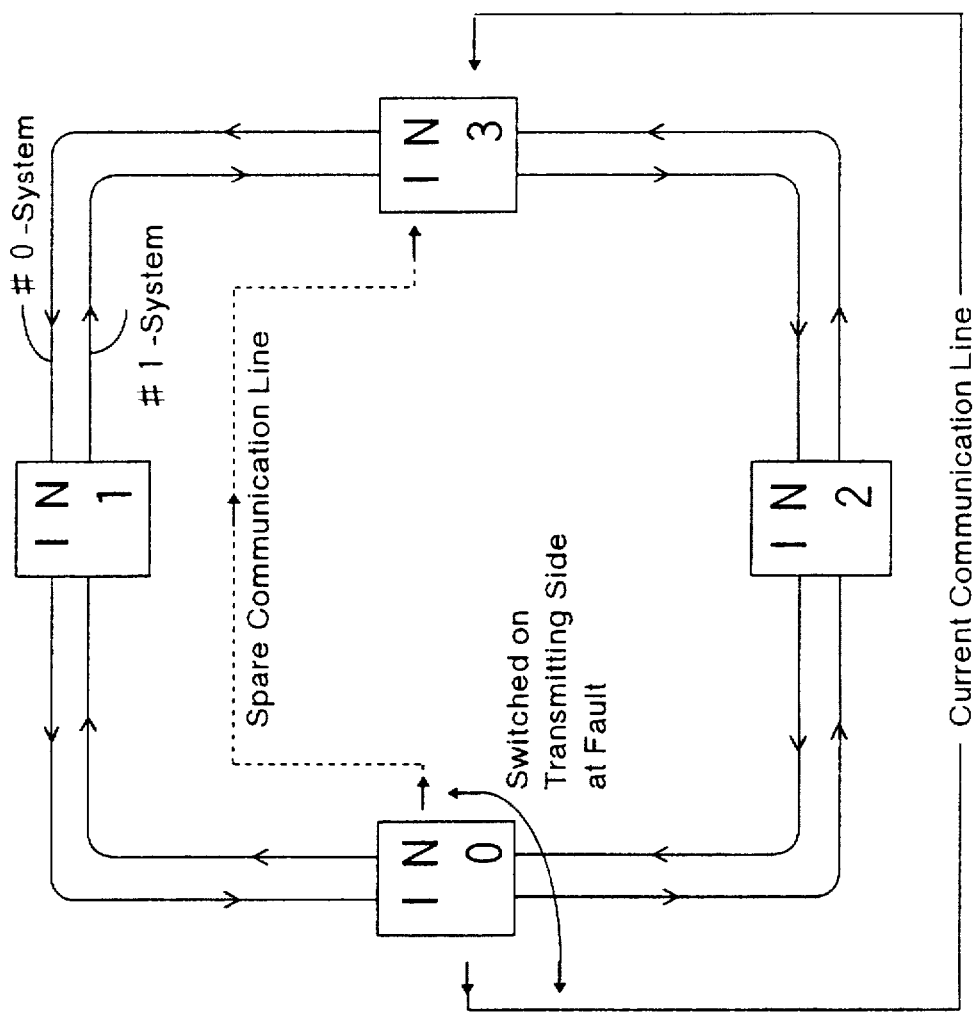
FIG. 24 is a diagram illustrating the basic construction of a conventional ring LAN.

FIG. 23 is a graphical representation illustrating the variable relation between the selection ratio and the number of cells in the relay buffer.

FIG. 23 shows that the selection ratio of relay cells increases (or higher priority is given to the transmission of relay cells) as the number of cells in the relay buffer increases (i.e., as a plot is located in a more right-handed position along the abscissa).

Where a node is expected to transmit important data, for example, a priority transmission option of the node allows the transmission of the important data to precede the transmission of relay data, thereby improving the efficiency of the transmission. On the other hand, where a node is expected to transmit unimportant data, a priority relay option of the node allows the transmission of relay cells to precede the transmission of the unimportant data.

Since transmission cells and relay cells are transmitted over the transmission lines in predetermined proportions on the basis of the measurement of the numbers of the transmission cells and relay cells as described above, the transmission efficiency can be improved. Further, the congestion of the transmission lines with relay cells can be alleviated by variably setting the proportions of the transmission cells and relay cells to be outputted to the transmission lines and, therefore, the transmission efficiency can be improved.

In accordance with the present invention, monitoring cells each having a pass indication area are simultaneously passed around duplexed transmission lines, and information indicative of the passage of a monitoring cell through a communication controlling device is written in the pass indication area of each of the monitoring cells. Therefore, the fault detection and fault reporting on the transmission lines can be achieved by using the monitoring cells of a single kind. This reduces the amount of data transmitted over the transmission lines, thereby improving the use efficiency of the transmission lines and shortening the time required for the fault detection.

Where a communication controlling device detects information indicative of the passage of the monitoring cell through the communication controlling device being written in the pass indication area in the monitoring cell received thereby, the communication controlling device erases the received monitoring cell. This improves the transmission efficiency of the transmission lines.

In accordance with the present invention, among a plurality of reception buffers for respective terminals connected to a communication controlling device, buffer selecting means of the communication controlling device selects a reception buffer in which the largest amount of data is accumulated, and check means of the communication controlling means checks an error in the data read out of the reception buffer thus selected. Therefore, fault detection in a connection path between the communication controlling device and each terminal can be realized by employing a simple circuit construction.

Further, synchronous time-division frames each accommodating an asynchronous communication frame having a synchronous pattern, a cell accommodating area, a transmission monitoring check pattern area and a monitoring area are outputted to duplexed transmission lines. Therefore, the time required for the detection of a fault occurring in the transmission lines can be shortened.

Still further, the synchronous time-division frame is relayed after relay information is written in a source address area provided in the check pattern area thereof. Therefore, when a fault is detected in one system transmission line, the transmission line can be promptly switched to the other system.

Yet further, since the proportions of data to be outputted from a transmission buffer and data to be outputted from a relay buffer are determined on the basis of the amounts of data accommodated in the transmission buffer and in the relay buffer, the transmission efficiency of the ring LAN can be improved.

What is claimed is:

1. A communication control method for a network including duplexed ring transmission lines and a plurality of communication controlling devices each accommodating a plurality of terminals and adapted to transmit data sent from any of the terminals and receive data over the ring transmission lines, the communication control method comprising the steps of:

causing one communication controlling device to transmit monitoring cells simultaneously over the duplexed transmission lines, the monitoring cells each including a pass indication area for retaining a source address and identification information for identifying a passed communication controlling device; and causing another communication controlling device which receives the monitoring cells respectively from the duplexed transmission lines to relay and circulate the monitoring cells respectively over the duplexed transmission lines after writing in the pass indication area of each of the received monitoring cells data indicative of passage indicating that each of said monitoring cells has passed through said another communication controlling device.

2. A communication control method as set forth in claim 1, wherein the communication controlling devices each extract data indicative of passed communication controlling devices from the pass indication areas of the monitoring cells respectively received from the duplexed transmission lines and compare the data with each other to detect a fault in the duplexed transmission lines.

3. A communication control method as set forth in claim 1, wherein said one communication controlling device erases a monitoring cell received thereby to prevent the monitoring cell from being relayed to an adjacent communication controlling device, if said one communication controlling device detects data indicative of passage being written in a pass indication area of the monitoring cell.

4. A communication control method as set forth in claim 1, wherein the communication controlling devices each include a plurality of reception buffers corresponding to the plurality of terminals and each adapted to receive data sent from a corresponding terminal connected thereto, buffer selecting means for checking the amount of data accumulated in each of the reception buffers and selecting a reception buffer retaining the largest amount of data, check means for checking an error of data read-out from the reception buffer selected by the buffer selecting means, and fault detecting means for indicating that an error occurs in the data received by the reception buffer or a fault occurs in a connection path connected to a terminal, in which, if an error is detected in the data read out of the reception buffer by the check means, the fault detecting means indicates that the data sent from a terminal corresponding to the reception buffer is abnormal, and if a reception buffer is not selected by the buffer selecting means for more than a predetermined period of time, the fault detecting means indicates that a connection path connected to a terminal corresponding to the reception buffer is abnormal.

5. A communication control method as set forth in claim 1, wherein the communication controlling devices each include:

dividing means for dividing a data sent from an asynchronous terminal into a plurality of cells having a fixed length, a generating means for an asynchronous communication frame having a synchronous pattern, a cell accommodating area including the plurality of cells, a check pattern area for transmission line monitoring, and a monitoring area for error detection, a second generating means for a synchronous time-division frame including synchronous data sent from a synchronous terminal and the asynchronous communication frame, to be transmit over the duplexed transmission lines.

6. A communication control method as set forth in claim 1, wherein the communication controlling devices each include:

a relay buffer for temporarily storing data of relay cells received from the transmission lines, a transmission buffer for storing data sent from any of the terminals, data amount detecting means for detecting the amount of the data stored in the relay buffer and the amount of the data stored in the transmission buffer, output proportion setting means for setting output proportions of data to be outputted from the relay buffer and data to be outputted from the transmission buffer for transmission over the transmission lines on the basis of the amounts of the data stored in the relay buffer and in the transmission buffer detected by the data amount detecting means, and selection controlling means for selecting either the data stored in the transmission buffer or the data stored in the relay buffer on the basis of the output proportions set by the output proportion setting means and transmitting the selected data over the transmission lines.

* * * * *